(12) United States Patent
Yoshimura

(10) Patent No.: US 6,798,600 B2
(45) Date of Patent: Sep. 28, 2004

(54) RECORDING MEDIUM REPRODUCING APPARATUS WITH RETRACTABLE LID COVERING MEDIUM INSERTION PORT

(75) Inventor: Harutoshi Yoshimura, Saitama (JP)

(73) Assignee: Sony Corporation, Tokyo (JP)

( * ) Notice: Subject to any disclaimer, the term of this patent is extended or adjusted under 35 U.S.C. 154(b) by 280 days.

(21) Appl. No.: 10/162,353

(22) Filed: Jun. 3, 2002

(65) Prior Publication Data

US 2002/0191323 A1 Dec. 19, 2002

(30) Foreign Application Priority Data

Jun. 4, 2001 (JP) ..................................... P2001-168143

(51) Int. Cl.[7] .......................... G11B 17/032; G11B 17/04
(52) U.S. Cl. ...................... 360/69; 360/99.07; 720/612; 720/647; 720/655
(58) Field of Search ............................... 360/69, 99.02, 360/99.03, 99.06, 99.07; 369/75.2, 77.1, 77.2; 720/612, 647, 655

(56) References Cited

U.S. PATENT DOCUMENTS

| | | | | | |
|---|---|---|---|---|---|
| 5,781,232 A | * | 7/1998 | Ejima | ....................... | 348/231.7 |
| 6,132,019 A | * | 10/2000 | Kim et al. | ................ | 312/223.2 |
| 6,219,226 B1 | * | 4/2001 | Bullington et al. | ......... | 361/683 |
| 6,268,997 B1 | * | 7/2001 | Hong | .......................... | 361/861 |
| 6,409,450 B1 | * | 6/2002 | Ostwald et al. | ............. | 414/277 |
| 6,690,528 B1 | * | 2/2004 | Kusumi et al. | ............... | 360/69 |

FOREIGN PATENT DOCUMENTS

JP          04001971 A   *  1/1992

* cited by examiner

Primary Examiner—David Hudspeth
Assistant Examiner—James L Habermehl
(74) Attorney, Agent, or Firm—Jay H. Maioli

(57) ABSTRACT

A recording medium reproducing apparatus includes a mechanical deck, a lid body, a first moving member, a second moving member, and a synchronization member. The mechanical deck has one end turnably supported by a chassis and the other end having a recording medium insertion port. The lid body is movable between a lid close position and a lid open position. The first moving member turns the mechanical deck between a reproducing position and an ejection position. The second moving member moves the lid body from the lid close position to the lid open position. The synchronization member controls the first and second moving members in synchronization with each other such that the lid body is moved inside the housing by the second moving member and the mechanical deck is turned to the ejection position by the first moving member to allow the recording medium insertion port to be directed outwardly.

11 Claims, 27 Drawing Sheets

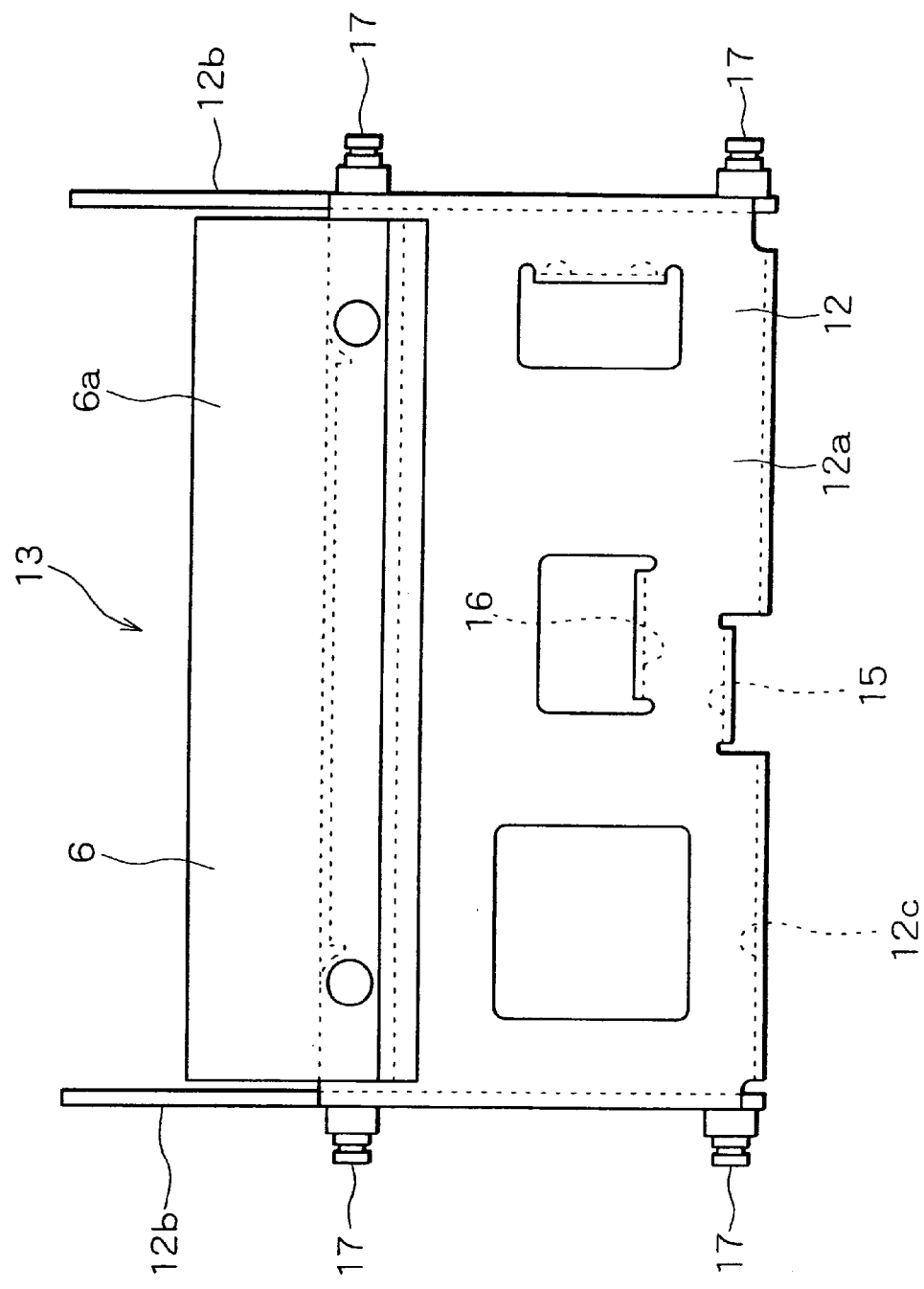

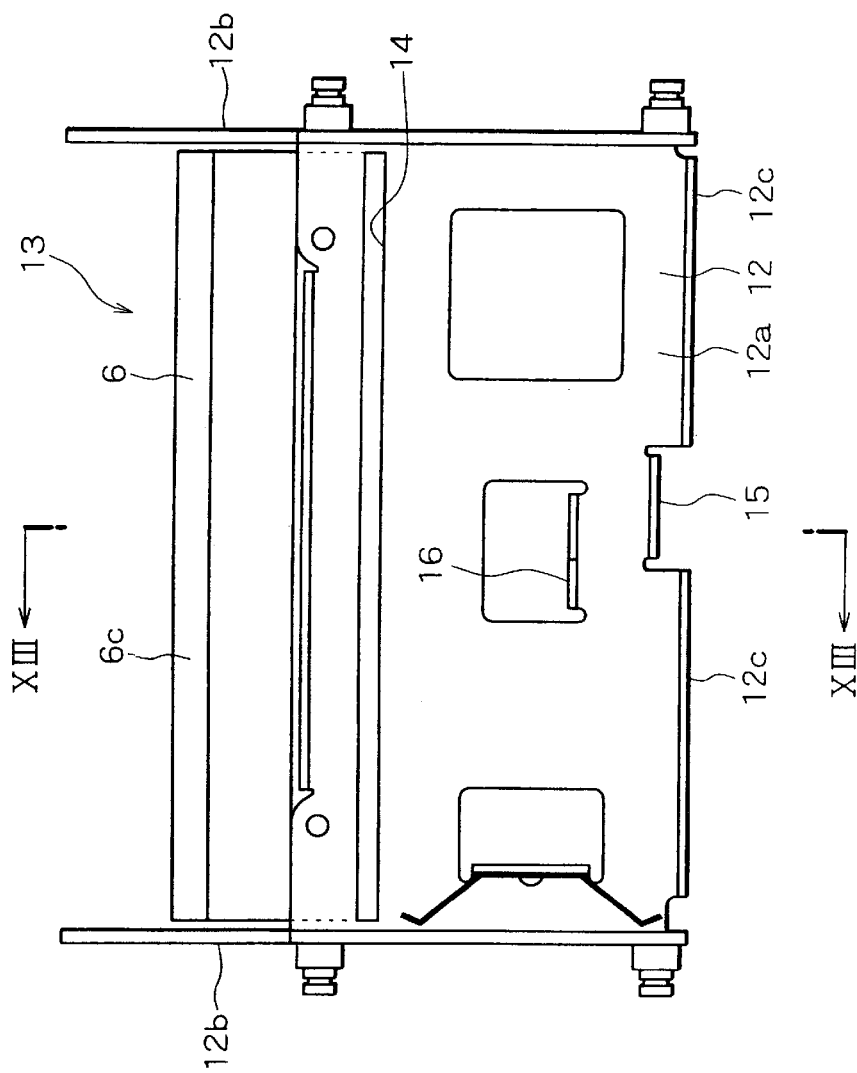

RECORDING MEDIUM REPRODUCING APPARATUS WITH RETRACTABLE LID COVERING MEDIUM INSERTION PORT

BACKGROUND OF THE INVENTION

The present invention relates to a recording medium reproducing apparatus and particularly to a recording medium reproducing apparatus in which any component does not project from a principal surface of a housing excluding a period in which a recording medium is inserted or ejected in or from the apparatus.

In recording medium reproducing apparatuses for reproducing information from recording media, it may be desirable that a recording medium insertion port through which a recording medium is inserted or ejected in or from the apparatus be concealed except for a period in which the recording medium is inserted or ejected in or from the apparatus, that is, when information is reproduced from the recording medium or the apparatus is not used, and that a lid body be positioned such that the outer surface thereof is continuous to the outer surface of the housing.

By the way, according to related art recording medium reproducing apparatuses, in the case of exchanging a recording medium in a dark room, it cannot be recognized whether or not an opening/closing lid is opened, and therefore, lamps in the room must be lighted for exchange of the recording medium.

SUMMARY OF THE INVENTION

An object of the present invention is to provide a recording medium reproducing apparatus in which any component does not project from a principal surface of a housing except for a period in which a recording medium is inserted or ejected in or from the apparatus.

To achieve the above object, according to the present invention, there is provided a recording medium reproducing apparatus including: a recording medium mounting portion provided such that one end thereof is turnably supported by a chassis main body and the other end thereof has a recording medium insertion port; a housing in which the recording mounting portion is housed; a lid body movable between a lid close position at which the lid body is positioned such that the outer surface thereof is continuous to the outer surface of the housing, to cover the recording medium insertion port, and a lid open position at which the lid body is positioned inside the housing, to open the recording medium insertion port; first moving means for turning the recording medium mounting portion between a reproducing position at which the recording medium insertion port is covered with the lid body and an ejection position at which the recording medium insertion port is directed outwardly; second moving means for moving the lid body from the lid close position to the lid open position; and synchronization means for controlling the first and second moving means in synchronization with each other in such a manner that the lid body is moved inside the housing by the second moving means and at the same time the recording medium mounting portion is turned to the ejection position by the first moving means to allow the recording medium insertion port to be directed outwardly.

With this configuration, since the recording medium insertion port through which a recording medium is inserted or ejected in or from the apparatus is concealed except for a period in which the recording medium is inserted or ejected in or from the apparatus, the inside of the apparatus is prevented from being touched by a user or a foreign matter is prevented from being permeated in the recording medium insertion port. Also, since the lid body in the state covering the recording medium insertion port forms a plane continuous to the outer surface of the housing, any component does not project from the outer surface of the housing, to give a neat external appearance, thereby creating a high-grade feeling.

Further, since the first moving means for moving the recording medium mounting portion and the second moving means for moving the lid body are controlled in synchronization with each other in such a manner that the motions thereof are matched with a good timing by the synchronization means, it is possible to prevent occurrence of an accident due to mismatching between the motions of the two moving means and to give a precise feeling, thereby creating a high-grade feeling.

The recording medium reproducing apparatus may further include: a guide hole, formed in the chassis main body, for guiding the movement of the lid body between the lid close position and the lid open position; and biasing means for biasing the lid body to the lid close portion; wherein the movement of the lid body to the lid close position is performed by the biasing means.

With this configuration, even if the movement of the lid body to the lid close position is obstructed, for example, by interposition of a foreign matter between the lid body and the recording medium mounting portion, an excess load is not applied to the moving means, to prevent a member forming the moving means from being damaged, and further, since only the biasing force of the biasing means is applied to the foreign matter, the foreign matter is prevented from being damaged.

The recording medium reproducing apparatus may further includes: means for defining a moving path of the lid body along which the lid body is moved in the inward direction of the housing from the lid close position, being separated apart from the recording medium insertion port, and is moved to the back surface side of the housing; and a turning arm provided on the second moving means in such a manner as to be turnable between a first position and a second position, the turning arm having a pressing portion for pressing the lid body to the lid open position when the turning arm is turned to the second position wherein the turning arm is provided with a lock portion for prohibiting the movement of the lid body, located at the lid close position, in the inward direction of the housing when the turning arm is located at the first position.

With this configuration, it is possible to prevent the lid body located at the lid close position from being forcibly opened. Also, since the lock portion is provided on the second moving means, it is possible to simplify the mechanism and to easily take a movement timing of the mechanism with the movement of the lid body.

The recording medium reproducing apparatus may further include: one drive member for driving the first moving means and second moving means, the drive member being driven by one motor.

With this configuration, it is possible to simplify the mechanism, and to easily, accurately perform the timing control of the two moving means.

In the recording medium reproducing apparatus, the recording medium mounting portion, located at the reproducing position, may be tilted from the housing such that an end portion in which the recording medium insertion port is formed is offset toward the ejection position side relative to an end portion on a turning fulcrum side.

With this configuration, it is possible to enlarge the gap between the recording medium insertion port and the outer surface of the housing, and hence to facilitate the insertion/ejection of the recording medium through the recording medium insertion port.

The recording medium reproducing apparatus may further include: imperfect state detecting means for detecting an imperfect state that a recording medium is positioned within the recording medium mounting portion but is not perfectly inserted therein; wherein the movement of the recording medium mounting portion to the reproducing position is prohibited when the imperfect state of the recording medium is detected by the imperfect state detecting means.

With this configuration, it is possible to prevent the recording medium or the recording medium reproducing apparatus from being damaged due to a careless operation such as a fail to eject the recording medium.

BRIEF DESCRIPTION OF THE DRAWINGS

These and other objects, features and advantages of the present invention will become more apparent from the following description taken in conjunction with the accompanying drawings, wherein

FIGS. 10A and 10B are schematic side views showing an advantage of a tilted reference plane of a mechanical deck in comparison with a comparative example, wherein FIG. 10A shows the mechanical deck of the present invention and FIG. 10B shows the mechanical deck of the comparative example;

FIG. 11 is a plan view of a lid body unit;

FIG. 12 is a bottom view of the lid body unit shown in FIG. 11;

DETAILED DESCRIPTION OF THE PREFERRED EMBODIMENT

Hereinafter, one embodiment of a recording medium reproducing apparatus of the present invention will be described with reference to the accompanying drawings. In this embodiment, the recording medium reproducing apparatus of the present invention is applied to a disc reproducing apparatus, wherein a disc cartridge composed of a flat cartridge in which a disc-like recording medium (hereinafter, referred to as "disc") is contained is mounted in a recording medium mounting portion, and signals recorded in the disc are reproduced.

The concept of the disc reproducing apparatus according to the present invention will be first described with reference to FIGS. 1 to 6.

Figure 1:
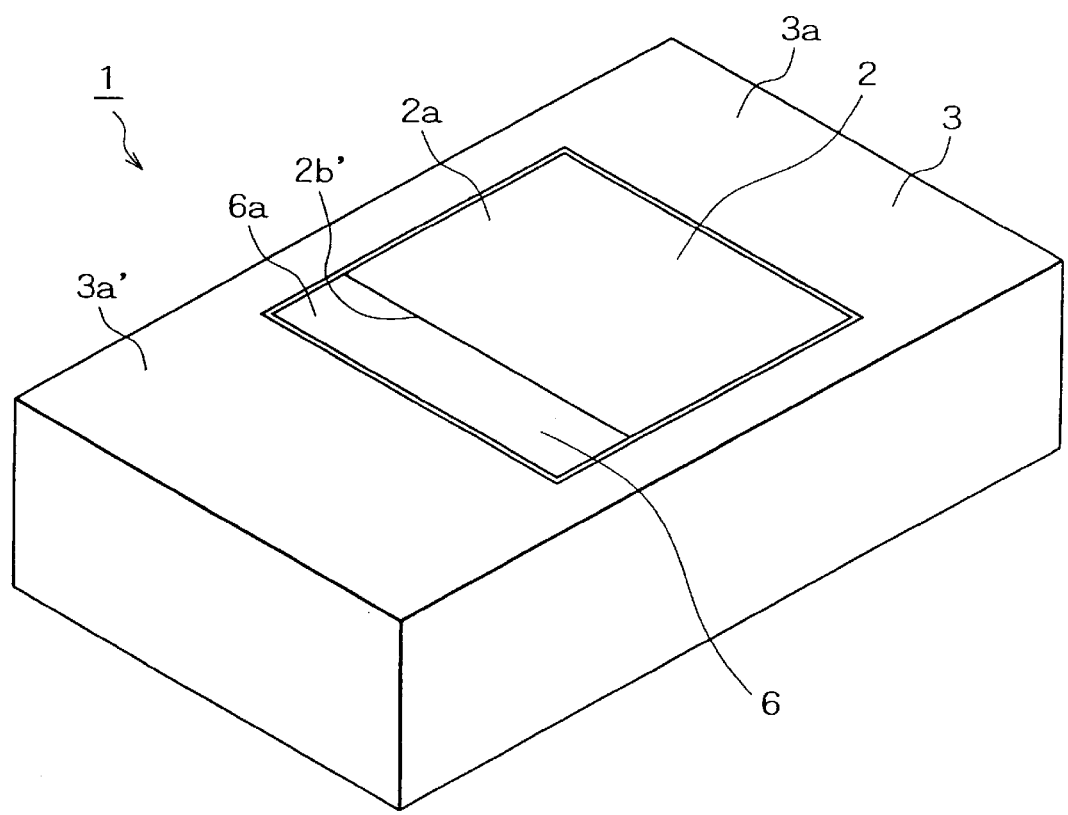
FIG. 1 is a schematic perspective view of an entire configuration of an embodiment of a recording medium reproducing apparatus of the present invention, showing a reproducing state of the apparatus.
Figure 2:
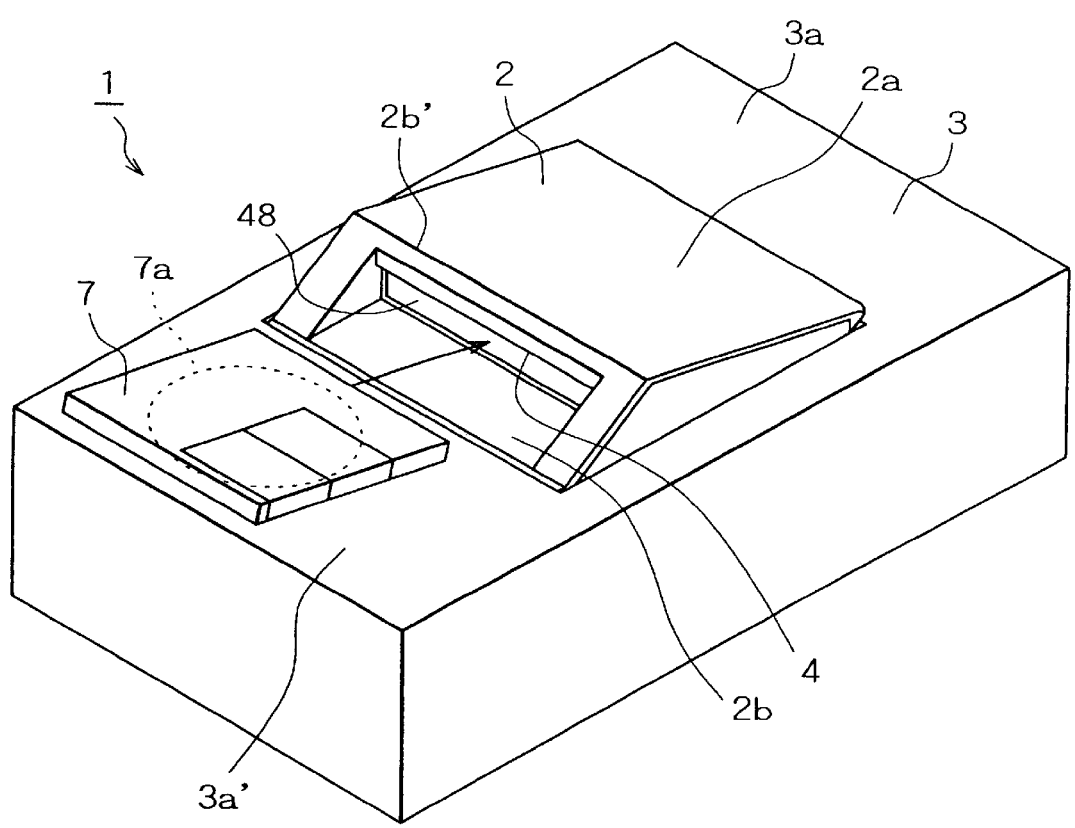
FIG. 2 is a schematic perspective view of the recording medium reproducing apparatus show in FIG. 1, showing an ejection state in which a disc cartridge is depicted as being placed on the apparatus.
Figure 3:
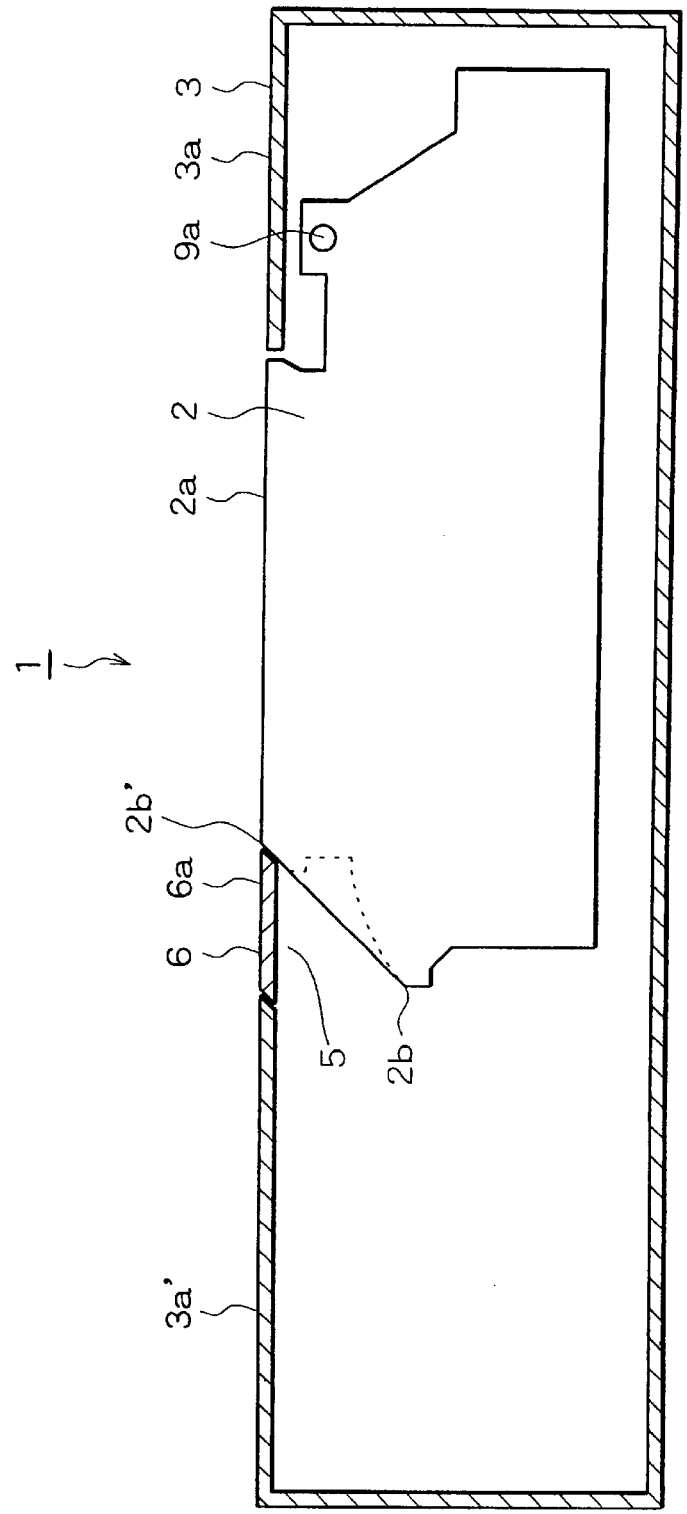
FIG. 3 is a schematic side view of the recording medium reproducing apparatus of the present invention with a housing cutaway, showing a state that a recording medium mounting portion is located at a reproducing position.

A disc reproducing apparatus 1 is kept in a reproducing state shown in FIGS. 1 and 3 when the apparatus 1 is in a non-service state, in a reproducing operation state, or in a stoppage state. In the reproducing state, a mechanical deck 2 as a disc mounting portion is located at a reproducing position at which an upper surface 2a thereof is within the same plane as that of an upper surface 3a of a housing 3. A front surface 2b (see FIG. 2) of the mechanical deck 2 is tilted forwardly, downwardly, and a horizontally elongated disc insertion port 4 as a recording medium insertion port is formed in the front surface 2b. An appropriate gap 5 (see FIG. 3) is provided between an upper end 2b' of the front surface 2b of the mechanical deck 2 and a front half portion 3a' of the upper surface 3a of the housing 3. A front end portion of the mechanical deck 2 is allowed to project upwardly through the gap 5.

In the reproducing state shown in FIGS. 1 and 3, the gap 5 is covered with a lid body 6. In this state, an upper surface 6a of the lid body 6 is within the same plane as that of each of the upper surface 3a of the housing 3 and the upper surface 2a of the mechanical deck 2. The position of the lid body 6 in this reproducing state is taken as a lid close position.

Figure 4:
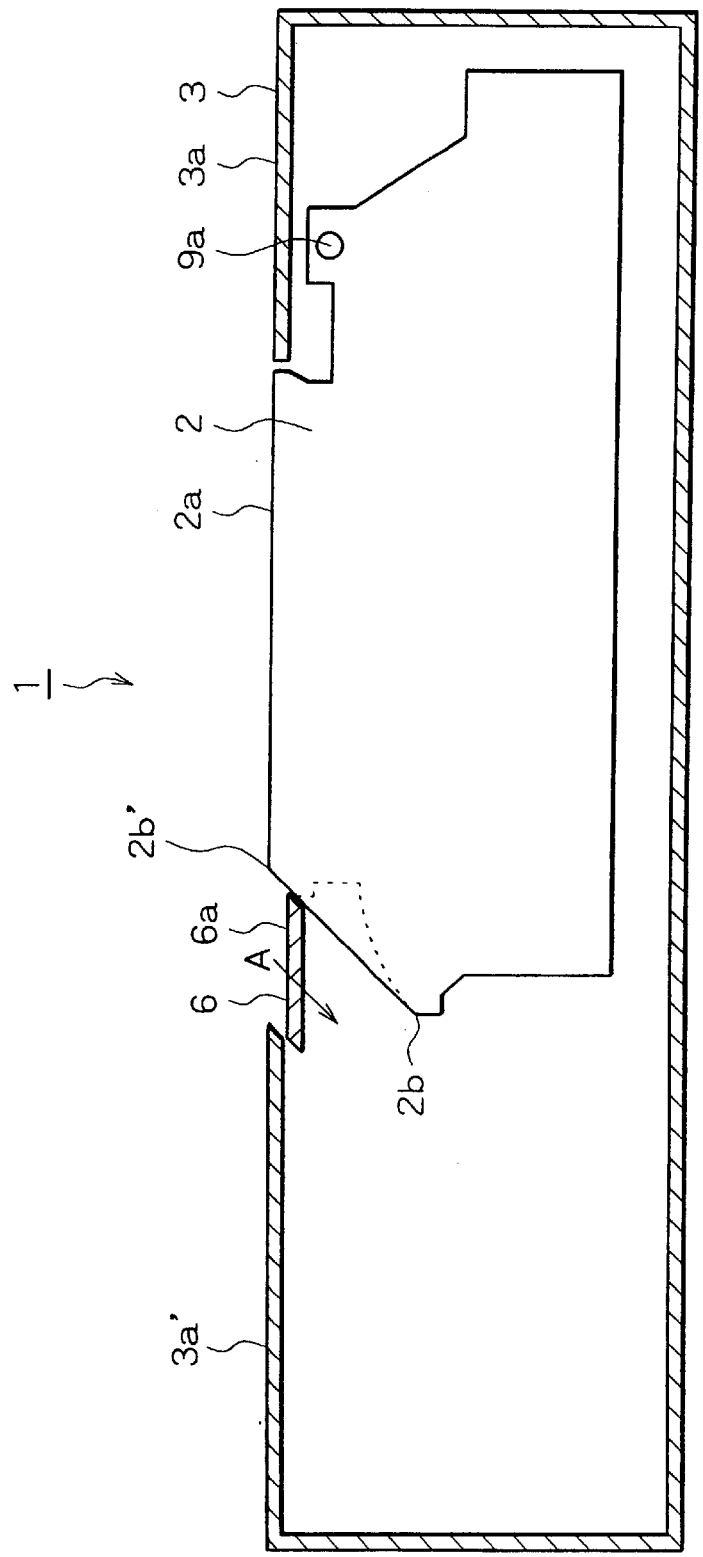
FIG. 4 is a schematic side view, similar to FIG. 3, showing a state that a lid body is started to be moved to a lid open position.

When an ejecting instruction is given by depressing an eject button (not shown) or the like, the lid body 6 is moved obliquely forwardly, downwardly, that is, in a direction shown by an arrow A in FIG. 4 to a specific position under the upper surface 3a of the housing 3.

Figure 5:
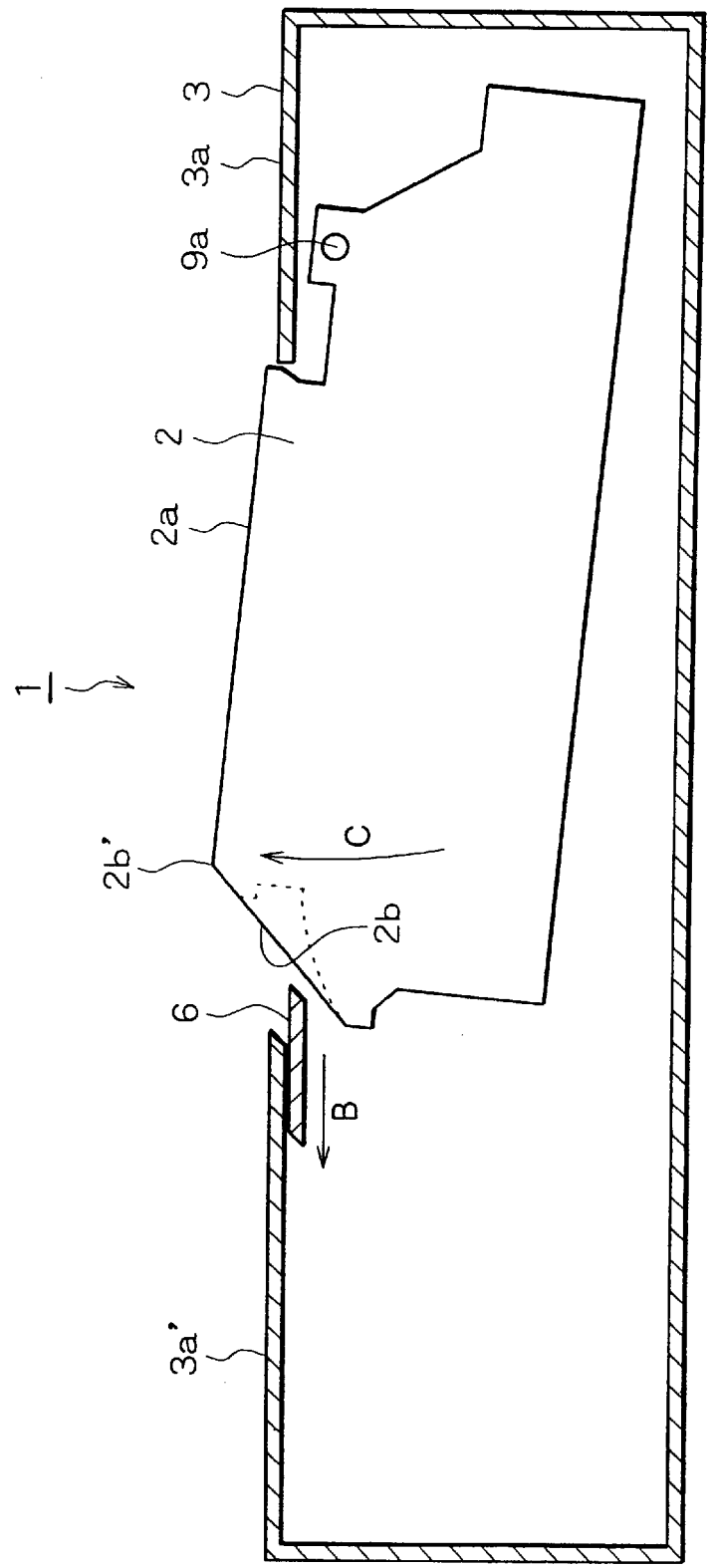
FIG. 5 is a schematic side view, similar to FIG. 3, showing a state that the lid body is being moved to the lid open position and the recording medium mounting portion is being moved to an ejection position.

The lid body 6 is then moved forwardly, that is, in a direction shown by an arrow B in FIG. 5, and at the same time, the mechanical deck 2 is started to be turned with its upper end portion moved upwardly around a turning fulcrum portion provided at a rear end portion thereof, that is, to be turned in a direction shown by an arrow C in FIG. 5.

Figure 6:
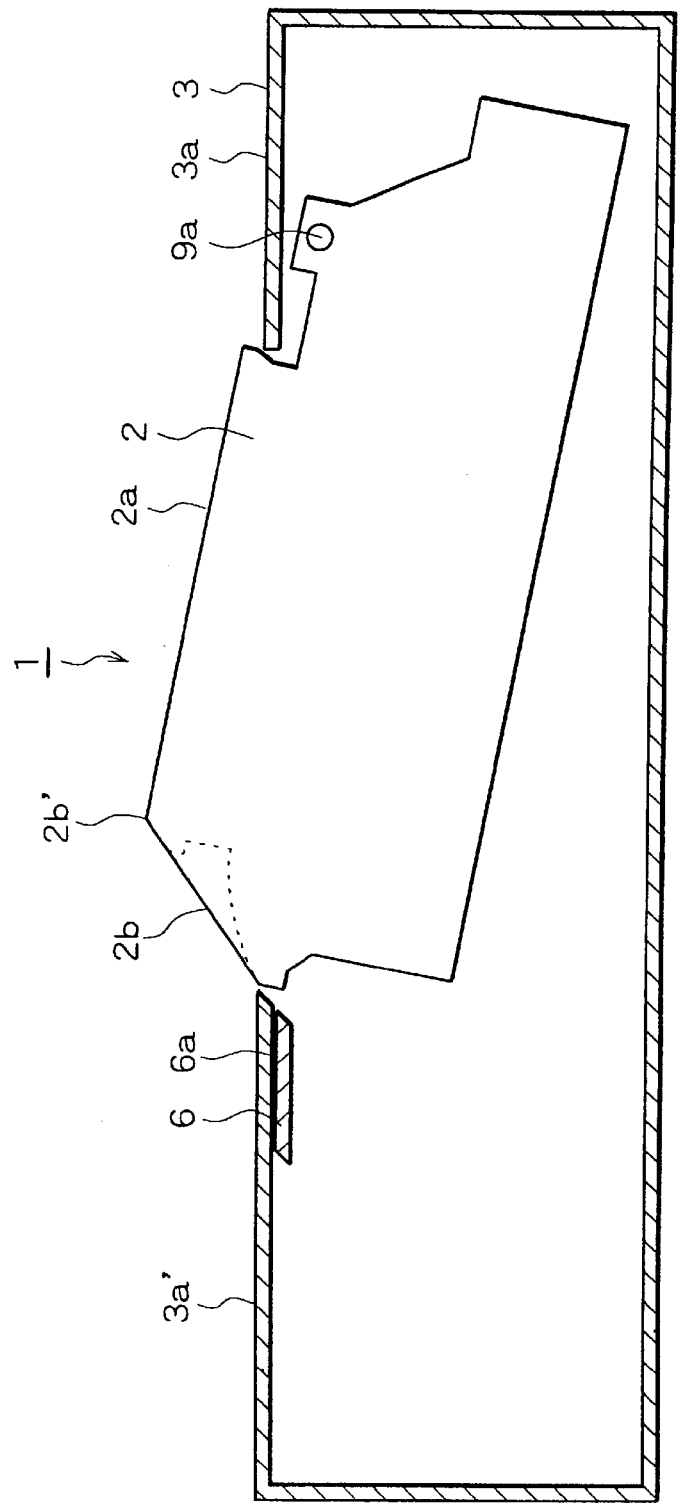
FIG. 6 is a schematic side view, similar to FIG. 3, showing a state that the lid body reaches the lid open position and the recording medium mounting portion reaches the ejection position.

When the lid body 6 is perfectly retreated under the upper surface 3a of the housing 3 and the mechanical deck 2 is turned until the front surface 2b of the mechanical deck 2 almost projects upwardly from the upper surface 3a of the housing 3 and thereby the disc insertion port 4 is perfectly exposed, the movement of the lid body 6 in the direction A and the turning of the mechanical deck 2 in the direction C are stopped (see FIGS. 2 and 6). The state shown in FIGS. 2 and 6 is taken as an ejection state. The position of the mechanical deck 2 in the ejection state is taken as an ejection position, and the position of the lid body 6 in the ejection state is taken as a lid open position. In such a state, a disc cartridge 7 (see FIG. 2) composed of a flat cartridge in which a disc 7a is contained is inserted in or ejected from the mechanical deck 2 through the disc insertion port 4.

The outline of a mechanism portion of the disc reproducing apparatus 1 will be more fully described with reference to FIGS. 7 and 8.

Figure 10A:
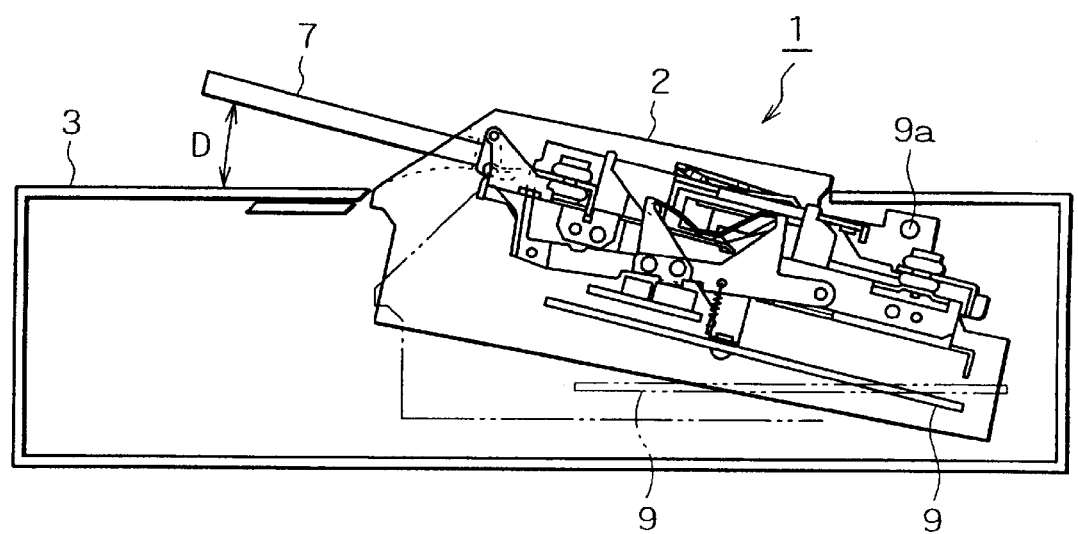
Figure 10B:
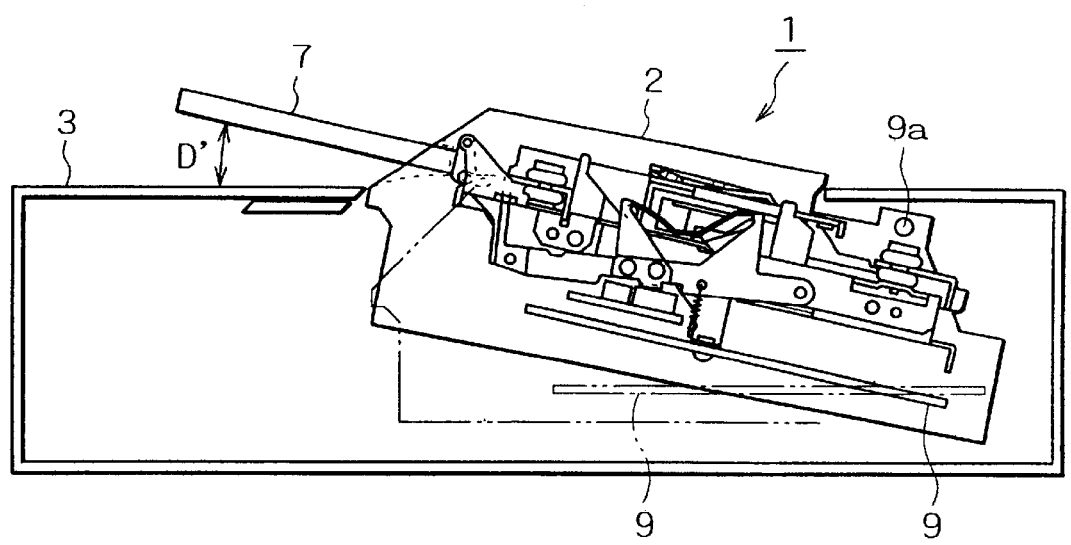

A chassis main body 8 is disposed in the housing 3. A rear end portion (turning fulcrum portion) 9a of a mechanical chassis 9 is turnably supported by a rear end portion of the chassis main body 8. A disc rotating device (not shown), members necessary for reproducing the disc 7a, such as a pickup device are disposed on the mechanical chassis 9, to constitute the mechanical deck 2 for reproducing the disc. In this disc reproducing apparatus 1, a reference plane of the mechanical deck 2, that is, a plane specifying a posture of a recording plane of the disc upon reproducing operation is tilted slightly forwardly, upwardly from the bottom plane of the mechanical chassis 9 (which becomes horizontal in the reproducing state). The forwardly, upwardly tilted reference plane (see the tilting of the disc cartridge 7 shown in each of FIGS. 10A and 10B) is advantageous in that a space D (see FIG. 10A) formed between the disc insertion port 4 and the upper surface 3a of the housing 3 in the ejection state becomes larger than a space D' (see FIG. 10B) formed in the case where the reference plane is parallel to the bottom plane of the mechanical chassis 9 (which becomes horizontal in the reproducing state), so that it is easier to insert or eject the disc cartridge 7 in or from the mechanical deck 2. If the reference plane of the mechanical deck 2 is set to be parallel to the bottom plane of the mechanical chassis 9 as shown in FIG. 10B, the amount of upward turning of the mechanical deck 2 must be increased for ensuring the same space as the space D shown in FIG. 10A. This causes inconveniences in increasing a burden on a moving means for turning the mechanical deck 2, and requiring a larger space over the housing 3 upon ejecting, thereby degrading the usability.

A pair of left side guide holes 10 and 11 and a pair of right side guide holes 10 and 11 are formed in front half portions of left and right side surface portions 8a of the chassis main body 8, respectively. The lid body 6 is moved along a specific locus while being guided by these guide holes 10 and 11. As shown in FIGS. 7 to 9, the guide hole 10, most of which extends in the horizontal direction, includes a horizontal portion 10a, and a rear end portion 10b tilted forwardly, downwardly as seen from the gap 5 side, and similarly, the guide hole 11, most of which extends in the horizontal direction, includes a horizontal portion 11a, and a rear end portion 11b tilted forwardly, downwardly as seen from the gap 5 side.

Figure 13:
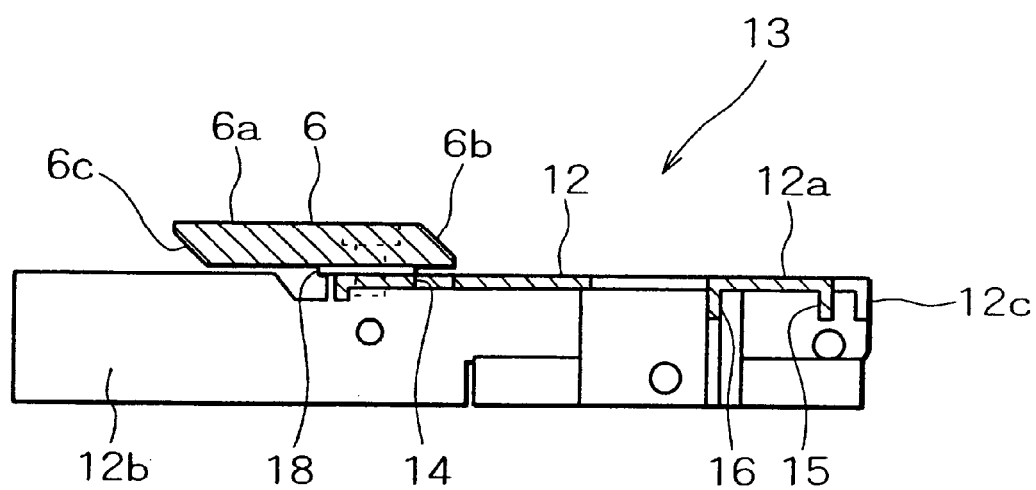
FIG. 13 is a sectional view taken on line XIII—XIII of FIG. 12.

As shown in FIGS. 11 to 13, the lid body 6 constitutes a lid unit 13 in cooperation with a supporting frame 12. The lid body 6 is made from a transparent material, for example, a transparent synthetic resin such as polycarbonate, and is formed into a slightly thick plate-like shape longer in the lateral direction. The lid body 6 has a front end portion 6b and a rear end portion 6c, each of which is formed into a tilt plane tilted forwardly, downwardly.

The supporting frame 12 is a one piece body having an upper surface portion 12a, both side surface portions 12b bent downwardly from both the side edges of the upper surface portion 12a, and a front surface portion 12c bent downwardly from the front edge of the upper surface portion 12a. The rear ends of the side surface portions 12b project rearwardly from the rear end of the upper surface portion 12a. A slit 14 extending in the lateral direction is formed in a rear end portion of the upper surface portion 12a. A piece 15 to be pressed is formed on an approximately central portion of a front end portion of the upper surface portion 12a in the lateral direction in such a manner as to project downwardly therefrom. A stopper piece 16 is formed on the upper surface portion 12a at a position slightly behind the piece 15 to be pressed in such a manner as to project downwardly therefrom. On each of the side surface portions 12b, two pins 17 to be guided are provided on a front end portion and an approximately central portion thereof in such a manner as to project outwardly therefrom.

The lid body 6 is fixed to a rear end portion of the supporting frame 12 in a state that the front end portion 6b is placed on an upper surface of the rear end portion of the supporting frame 12 in such a manner that the tilt plane of the front end portion 6b faces, from above, to the slit 14. A thin plate material having a metallic luster, for example, a thin aluminum plate 18 is interposed between the lid 6 and a portion, positioned in front of the slit 14, of the supporting frame 12.

The pins 17 to be guided are slidably supported in the guide holes 10 and 11 formed in both the side surface portions 8a of the chassis main body 8, so that the lid body unit 13 is supported by the chassis main body 8 in such a manner as to be moved along the above-described locus in the state that the pins 17 are guided in the guide holes 10 and 11. Two spring catch portions 19 (only one is shown in FIGS. 7 to 9) are formed on both the side surface portions 8a of the chassis main body 8, and two tensile coil springs 20 (only one is shown in FIGS. 7 to 9) are stretched between the spring catch portions 19 and two pins 17 to be guided of the rear side of the lid body unit 13. The lid body unit 13 is thus biased rearwardly, that is, in a direction shown by an arrow E in FIG. 7 by the biasing forces of the tensile coil springs 20.

Figure 7:
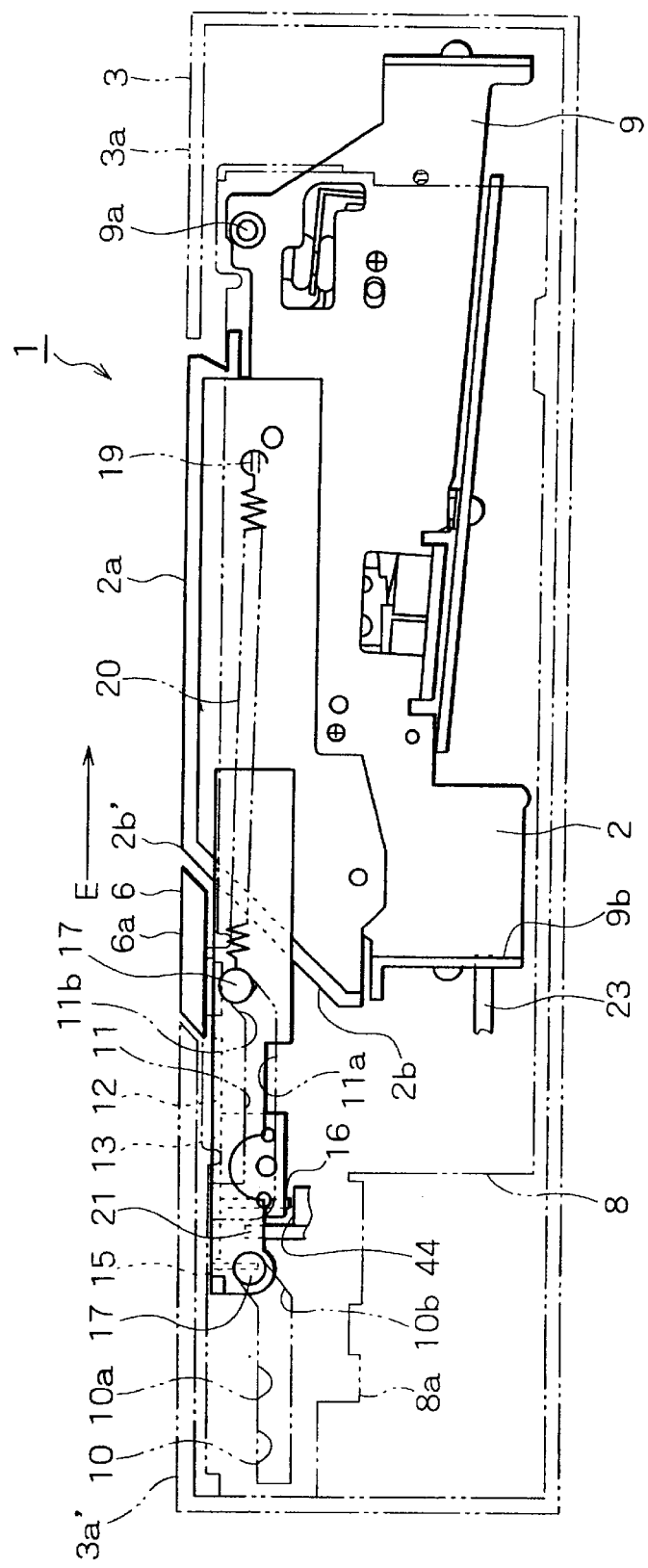
FIG. 7 is a schematic side view of a mechanism portion, showing a reproducing state.
Figure 8:
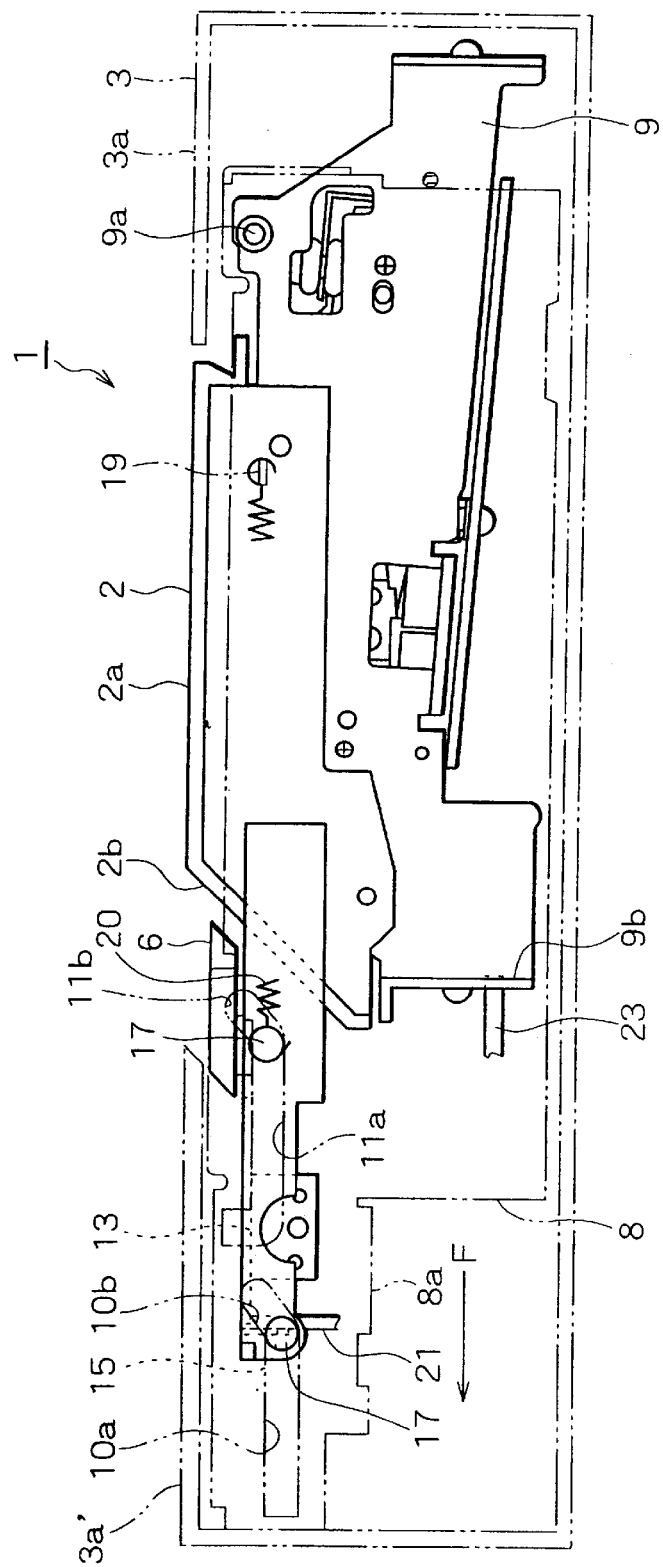
FIG. 8 is a schematic side view, similar to FIG. 7, showing a state that the lid body is moved downwardly from the position shown in FIG. 7.
Figure 9:
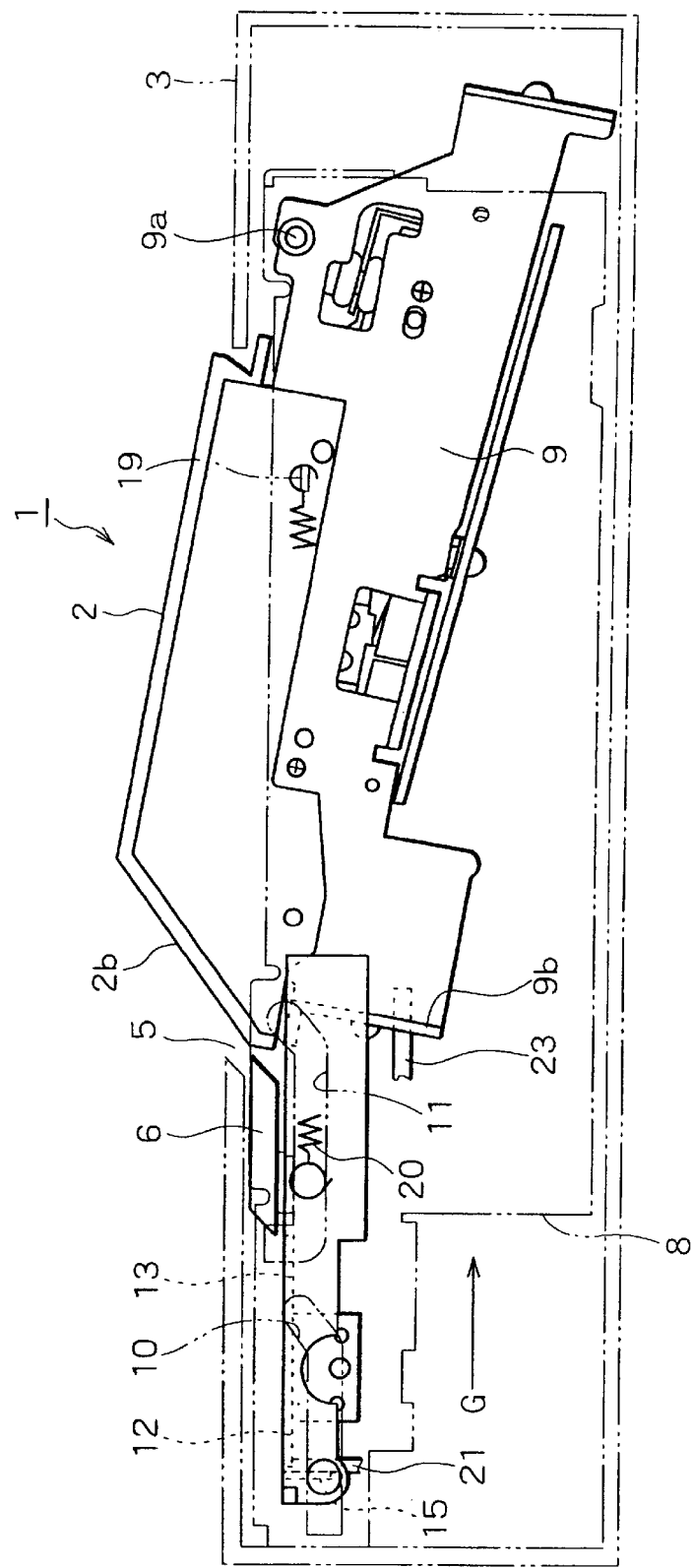
FIG. 9 is a schematic side view, similar to FIG. 7, showing an ejection state.

As shown in FIGS. 7 to 9, a moving means (which will be described in detail later) for moving the lid body unit 13 has a pressing projection 21. As is apparent from FIG. 7, in the reproducing state, the pins 17 to be guided of the lid body unit 13 are located at the rear ends of the guide holes 10 and 11, and the lid body 6 is positioned in the gap 5 between the upper end 2b' of the front surface of the mechanical deck 2 and the rear end of the front half portion 3a' of the upper surface 3a of the housing 3. At this time, the pressing projection 21 of the moving means is separated slightly rearwardly from the piece 15 to be pressed of the lid body unit 13.

When an ejecting instruction is given for bringing the mechanical deck 2 into the ejection state shown in FIG. 2, the moving means is operated to move the pressing projection 21 forwardly, that is, in a direction shown by an arrow F in FIG. 8. The pressing projection 21 comes in direct-contact with the rear surface of the piece 15 to be pressed of the lid body unit 13, to thereby press the piece 15 forwardly. At this time, the pins 17 to be guided of the lid body unit 13 are first moved forwardly, downwardly, that is, in the direction A shown in FIG. 4 along the tilt portions 10b and 11b of the guide holes 10 and 11, whereby the lid body unit 13 is moved forwardly, downwardly. When the pins 17 to be guided reach the front ends of the tilt portions 10b and 11b of the guide holes 10 and 11 (in the state shown in FIG. 8), the lid body 6 is positioned under the front half portion 3a' of the upper surface 3a of the housing 3. It is to be noted that until the lid body 6 reaches the position shown in FIG. 8, the mechanical deck 2 is not turned upwardly but is kept in the reproducing position.

After reaching the positions shown in FIG. 8, the pins 17 to be guided are moved forwardly along the horizontal directions 10a and 11a of the guide holes 10 and 11, whereby the lid body unit 13 is moved forwardly in the horizontal direction. When the lid body 6 reaches the lid open position perfectly concealed under the upper surface 3a of the housing 3, the lid body unit 13 is stopped. On the other hand, when the lid body unit 13 reaches the lower ends of the tilt portions 10b and 11b of the guide holes 10 and 11, the mechanical deck 2 is started to be turned upwardly, to reach the ejection position after the lid body reaches the lid open position (see FIG. 9). The turning of the mechanical deck 2 will be described in detail later.

When a reproducing instruction is given for bringing the mechanical deck 2 from the ejecting state to the reproducing state, the mechanical deck 2 is started to be downwardly, that is, toward the reproducing position. At this time, the pressing projection 21 is moved rearwardly, that is, in a direction shown by an arrow G in FIG. 9, and when the pressing projection 21 reaches the position shown in FIG. 8, the mechanical deck 2 reaches the reproducing position. The pressing projection 21 is further moved to the position shown in FIG. 7, and is stopped thereat. From the position shown in FIG. 9 to the position shown in FIG. 7, the pressing projection 21 is moved so as not to directly press the piece 15 of the lid body unit 13 but to go away rearwardly from the piece 15 to be pressed.

The pressing projection 21 thus no longer functions to obstruct the movement of the lid body unit 13 by the biasing forces of the tensile coil spring 20. As a result, the piece 15 to be pressed is moved rearwardly while following the pressing projection 21. After being moved to the position shown in FIG. 8, the piece 15 to be pressed is moved rearwardly, upwardly. When the lid body 6 reaches to the lid close position shown in FIG. 7, the pins 17 to be guided come into contact with the rear ends of the tilt portions 10a and 11a of the guide holes 10 and 11, to be stopped thereat.

Figure 14:
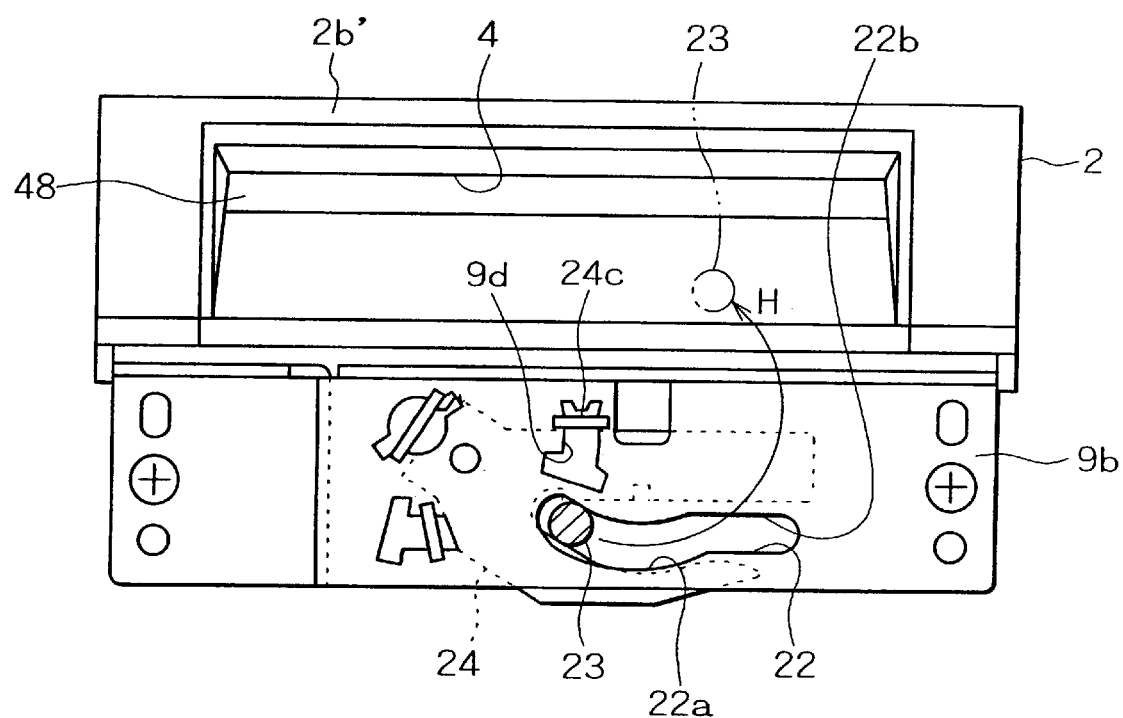
FIG. 14 is a front view of a mechanical deck.

As shown in FIG. 14, a cam hole 22 is formed in a front surface portion 9b of the mechanical chassis 9, and a moving means (which will be described in detail later) for turning the mechanical deck 2 has a drive pin 23 slidably fitted in the cam hole 22. The circular motion of the drive pin 23 moves the front end portion of the mechanical deck 2 in the vertical direction, whereby the mechanical deck 2 is turned between the reproducing position and the ejection position. The cam hole 22 has a projecting circular-arc portion 22a on the lower side of a nearly left half thereof as seen from front, and a horizontal portion 22b continuous to the right end of the circular-arc portion 22a and extending in the horizontal direction. The circular-arc portion 22a has a circular-arc shape forming part of a circular-arc locus of the drive pin 23 centered at the rotational axis of the drive pin 23. When the mechanical deck 2 is located at the reproducing position, the drive pin 23 is located at a left end portion of the circular-arc portion 22a of the cam hole 22. In the case of turning the mechanical deck 2 to the ejection position, the drive pin 23 is, as shown in FIG. 14, turned counterclockwise, that is, in a direction shown by an arrow H to a position shown by a two-dotted line along a circular-arc locus shown by a solid line. Since the circular-arc portion 22a of the cam hole 22 has the shape forming part of the circular-arc locus (shown by the arrow H) of the drive pin 23 centered at the rotational axis of the drive pin 23 as described above, the drive pin 23 is not turned during a period in which the drive pin 23 is moved from the left end to the right end of the circular-arc portion 22a, and during such a period, the lid body 6 is moved to the position shown in FIGS. 4 and 8. On the other hand, in the case of turning the mechanical deck 2 from the ejection position to the reproducing position, because of the presence of the circular-arc portion 22a, after the mechanical deck 2 reaches to the reproducing position, the lid body 6 is further moved to the lid close position.

Figure 15:
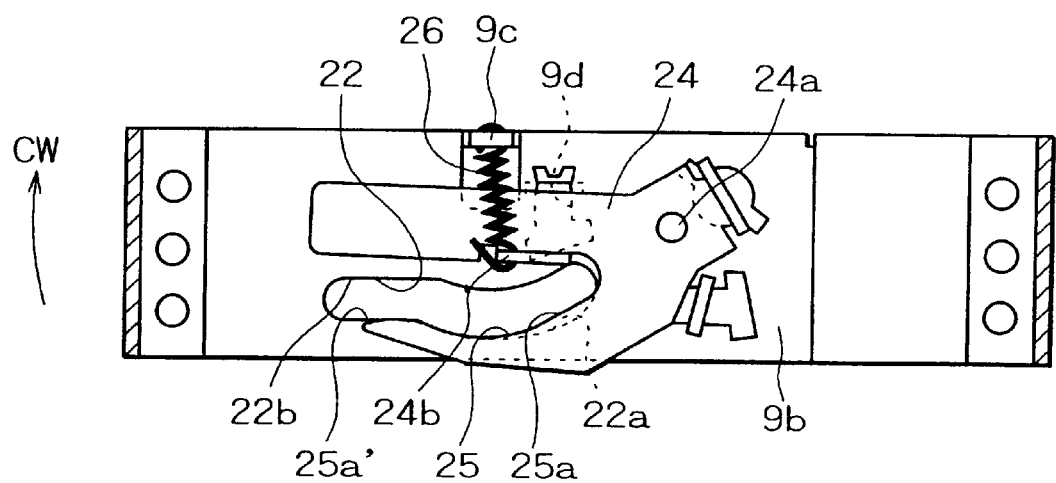
FIG. 15 is a rear view of a front surface portion of a mechanical chassis.

As shown in FIG. 15, an elastic contact member 24 is provided on the rear surface of the front surface portion 9b of the mechanical chassis 9. The elastic contact member 24 is formed into a plate-like shape longer in the lateral direction and has a cutout 25 extending longer in the lateral direction and opened at its right end. A lower edge 25a of the cutout 25, excluding a portion 25a' on the opening side, is formed into a shape having a curvature being nearly equal to that of the lower edge of the circular-arc portion 22a of the cam hole 22. The portion 25a' on the opening side is formed into a linear shape straightly extending outwardly from the circular-arc portion 22a.

A left end portion 24a of the elastic contact member 24 is turnably supported on the rear surface of the front surface portion 9b of the mechanical chassis 9, and a tensile coil spring 26 is stretched between a spring catch piece 24b of the elastic contact member 24 and a spring catch piece 9c of the front surface portion 9b of the mechanical chassis 9. The elastic contact member 24 is thus biased clockwise, that is, in a direction shown by an arrow CW in FIG. 15. A stopper piece 24c (see FIG. 14) is provided on the elastic contact member 24 in such a manner as to project to the front surface portion 9b side. The clockwise turning motion of the elastic contact member 24 is stopped when the stopper piece 24c comes in contact with the upper edge of a cutout hole 9d formed in the front surface portion 9b of the mechanical chassis 9. In such a state, part of the lower edge 25a of the cutout 25 of the elastic contact member 24 projects slightly upwardly from the left end portion of the lower edge of the circular-arc portion 22a of the cam hole 22 (see FIG. 15). As a result, in the state that the mechanical deck 2 is located at the reproducing position, the lower edge 25a of the cutout 25 of the elastic contact member 24 is brought into elastic contact with the drive pin 23, to absorb a large difference between the outer diameter of the drive pin 23 and the width of the circular-arc portion 22a of the cam hole 22, thereby preventing looseness of the mechanical deck 2.

The moving means for moving the mechanical deck 2 and the moving means for moving the lid body 6 will be described in detail below.

Figure 16:
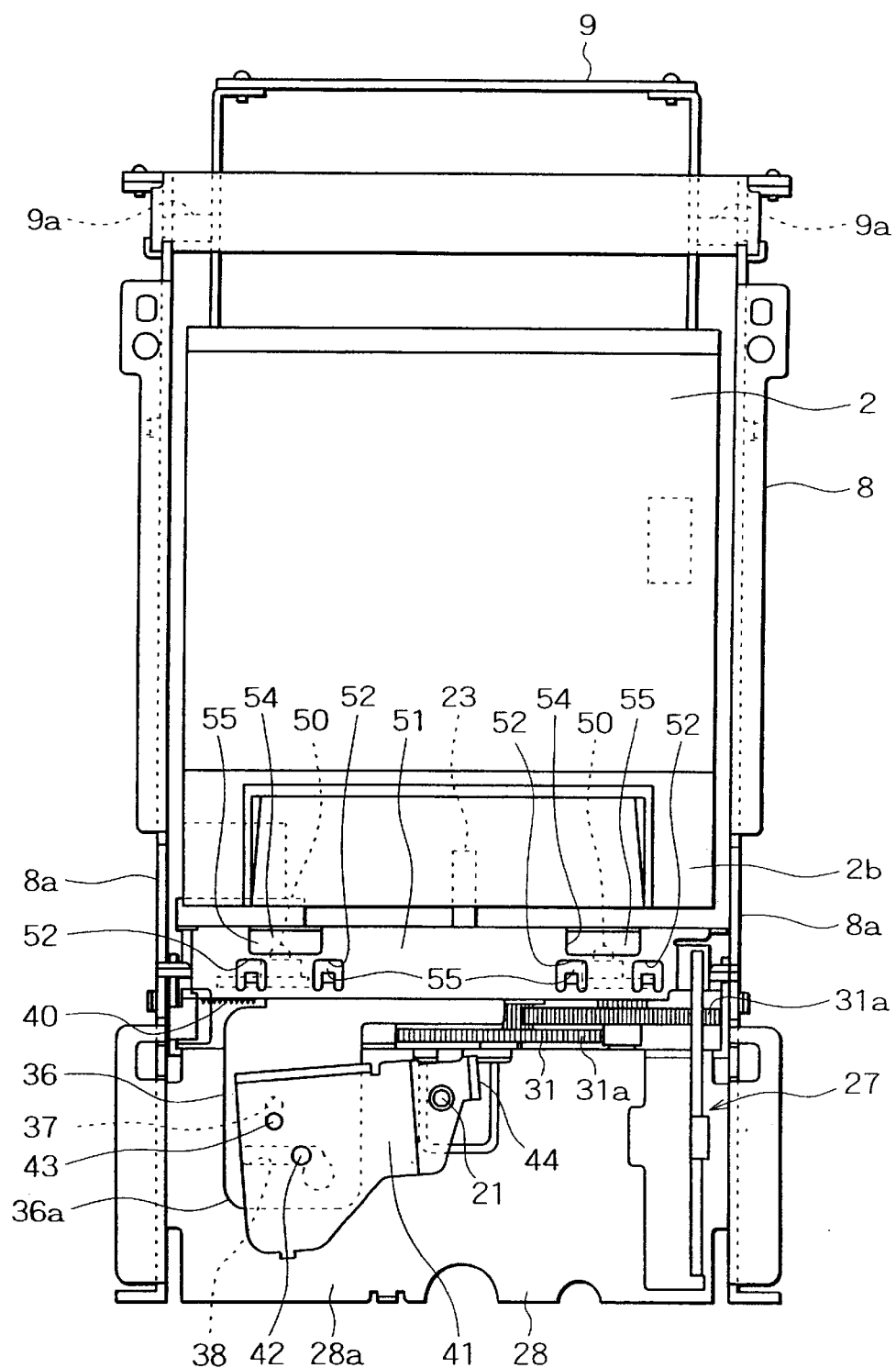
FIG. 16 is a plan view showing an entire configuration of a disc reproducing apparatus from which a housing and a lid body unit are removed.

As shown in FIG. 16, a drive mechanism portion 27 is disposed on a front half portion of the chassis main body 8. The drive mechanism portion 27 is provided on a drive portion chassis 28 fixed to the front half portion of the chassis main body 8.

The drive portion chassis 28 includes an upper surface portion 28a and a rear surface portion 28b (see FIG. 19) projecting downwardly from the rear end of the upper surface portion 28a. A cam gear 29 is rotatably supported on an approximately central portion of the rear surface portion 28b. A motor 30 is supported on the rear surface portion 28b of the drive portion chassis 28. The rotation of the motor 30 is transmitted to the cam gear 29 via a gear reduction mechanism 31 composed of a plurality of gears 31a. The above-described drive pin 23 projects rearwardly from a portion, near the peripheral edge, of the rear surface of the cam gear 29 (see FIG. 20). Two switch operating projections 32a and 32b are projectingly provided on a peripheral portion of the rear surface of the cam gear 29 in such a manner as to be separated from each other by an angle of approximately 180° in the peripheral direction. A stop switch 33 is disposed on the rear surface portion 28b of the drive portion chassis 28 at a position near the cam gear 29. An operating piece 33a of the stop switch 33 projects on the rear surface side of the cam gear 29 (see FIG. 20). The operating piece 33a is kept at a neutral position shown by a dashed line in FIG. 20 when it is not pushed by the switch operating projection 32a or 32b.

Figure 20:
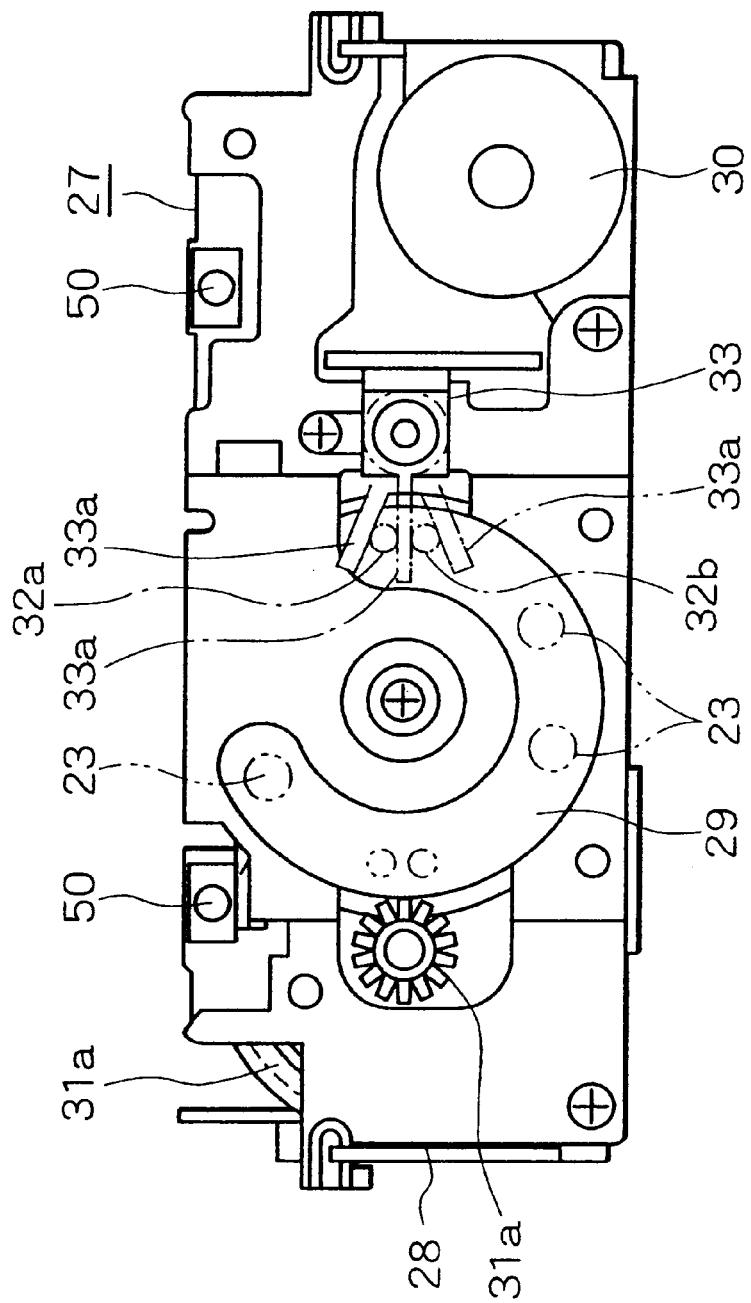
FIG. 20 is a rear view of the drive mechanism portion shown in FIG. 17, from which a rear cover is removed.

In the reproducing state, the operating piece 33a of the stop switch 33 is pushed up by the switch operating piece 32a of the cam gear 29, to be brought into the leftward, upward tilt state shown by a solid line in FIG. 20. When an ejecting instruction is given for bringing the mechanical deck 2 into the ejection state, the motor 30 is started to be rotated so as to rotate the cam gear 29 clockwise in FIG. 20. Accordingly, the switch operating projection 32a goes apart from the operating piece 33a of the stop switch 33, with a result that the operating piece 33a is kept in the neutral position shown by a dashed line in FIG. 20. As the cam gear 29 is further continuously rotated and thereby the mechanical deck 2 becomes close to the ejection state, the switch operating projection 32b pushes down the operating piece 33a of the stop switch 33, with the result that the operating piece 33a is brought into a state shown by a two-dotted line in FIG. 20, to actuate the stop switch 33, thereby stopping the operation of the motor 30. On the contrary, in the case of bringing the mechanical deck 2 from the ejection state into the reproducing state, the motor 30 is rotated in the direction reversed to the above-described direction on the basis of a reproducing instruction, so that the cam gear 29 is rotated counterclockwise in FIG. 20, and finally the switch operating projection 32a pushes, from below, the operating piece 33a of the stop switch 33, with a result that the operating piece 33a is brought into the state shown by the solid line in FIG. 20, to actuate the stop switch 33, thereby stopping the operation of the motor 30. A first moving means for turning the mechanical deck 2 is thus composed of the cam hole 22 and the drive pin 23 driven by the cam gear 29 with the motor 30 taken as a drive source.

A second moving means for moving the lid body unit 13 to the lid open position is composed of the above-described piece 15 to be pressed and pressing projection 21, and further, a cam edge formed on the front surface of the cam gear 29, a slider moved by the cam edge, and a turning arm turned by the slider.

Figure 21:
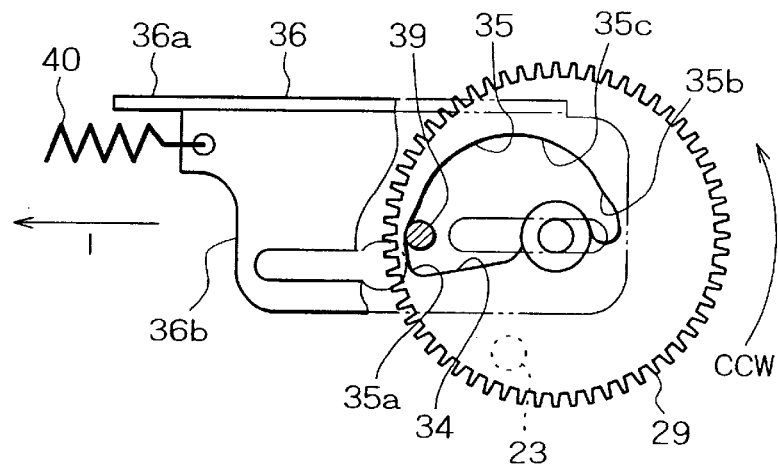
FIG. 21 is a front view of an essential portion of the drive mechanism portion for illustrating a relationship between a slider and a cam gear, showing a state that the lid body is located at a lid close position.
Figure 22:
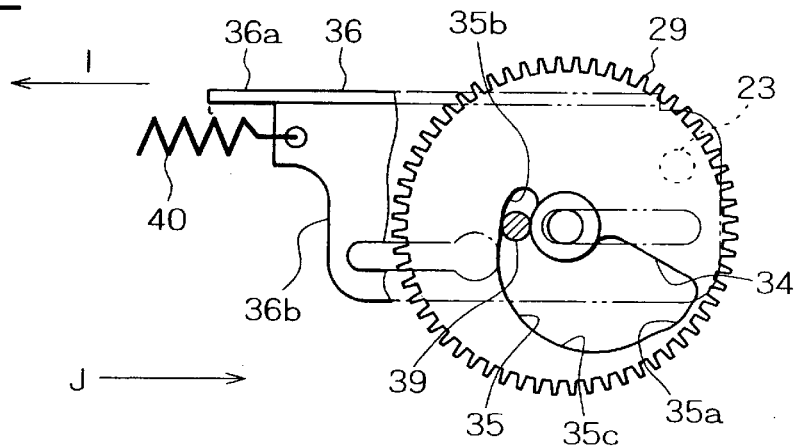
FIG. 22 is a front view, similar to FIG. 21, showing a state immediately before the lid body reaches the lid open position.
Figure 23:
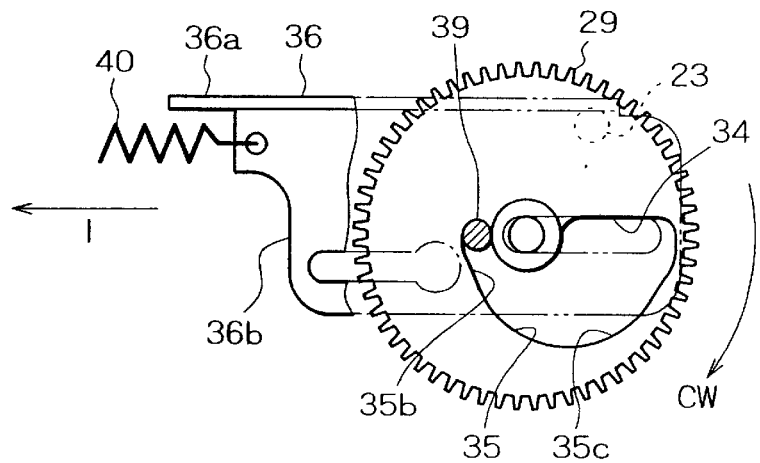
FIG. 23 is a front view, similar to FIG. 21, showing a state that the lid body is located at the lid open position.

As shown in FIGS. 21 to 23, an approximately crescent recess 34 is formed in the front surface of the cam gear 29. A circular-arc portion 35 of the recess 34 is taken as the cam edge. The cam edge 35 is formed into a circular-arc shape extending from a portion, near the peripheral edge, of the cam gear 29 to a central portion of the cam gear 29. Each of the initial portion 35a on the peripheral edge side and the terminal portion 35b on the central side is taken as a non-variable region in which a distance between a point in the region and the center of the cam gear 29 is not variable irrespective of its position. An intermediate portion 35c between the initial portion 35a and the terminal portion 35b is taken as a variable region in which a distance between a point in the region and the center of the cam gear 29 is gradually variable depending on its position.

A slider 36 is supported on the drive portion chassis 28 in such a manner as to be movable in the lateral direction. As shown in FIGS. 21 to 26, the slider 36 has an upper surface portion 36a and a rear surface portion 36b. The upper surface portion 36a has a connection hole 37 slightly longer in the longitudinal direction and an escape hole 38 longer in the lateral direction. A cam follower 39 is provided on the rear surface of the rear surface portion 36b in such a manner as to project therefrom. The cam follower 39 is positioned in the recess 34 of the cam gear 29. A tensile coil spring 40 is stretched between the left end of an upper end portion of the rear surface portion 36b and the left end portion of the drive portion chassis 28 (see FIGS. 24 to 26), whereby the slider 36 is biased leftwardly, that is, in a direction shown by an arrow I in FIGS. 21 to 23. The cam follower 39 thus biased by the tensile coil spring 40 is brought into elastic constant with the cam edge 35 of the cam gear 29 (see FIGS. 21 to 23).

Figure 24:
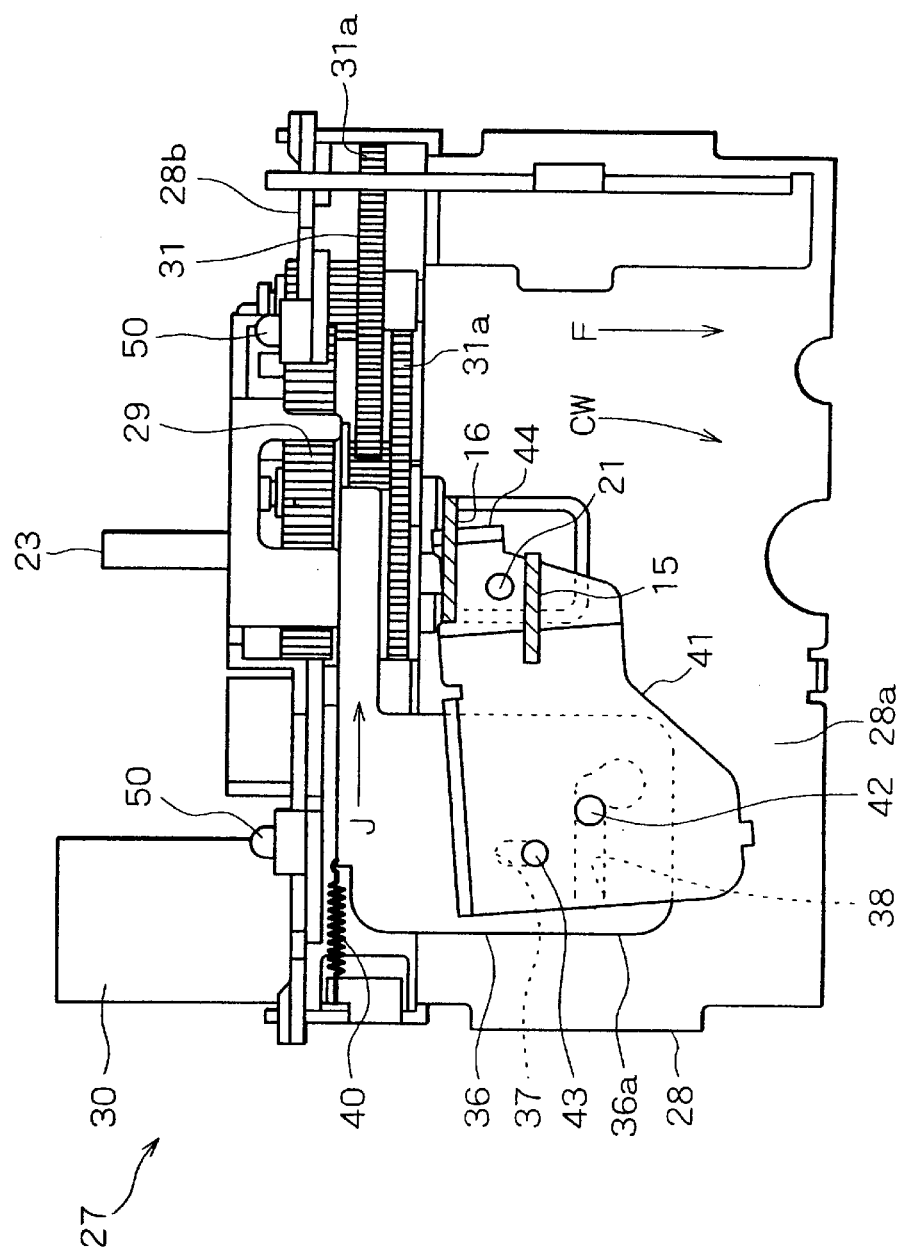
FIG. 24 is a plan view of an essential portion of the drive mechanism portion for illustrating a relationship between the slider and a turning arm, showing a state that the lid body is located at the lid close position, which state corresponds to that shown in FIG. 21.
Figure 25:
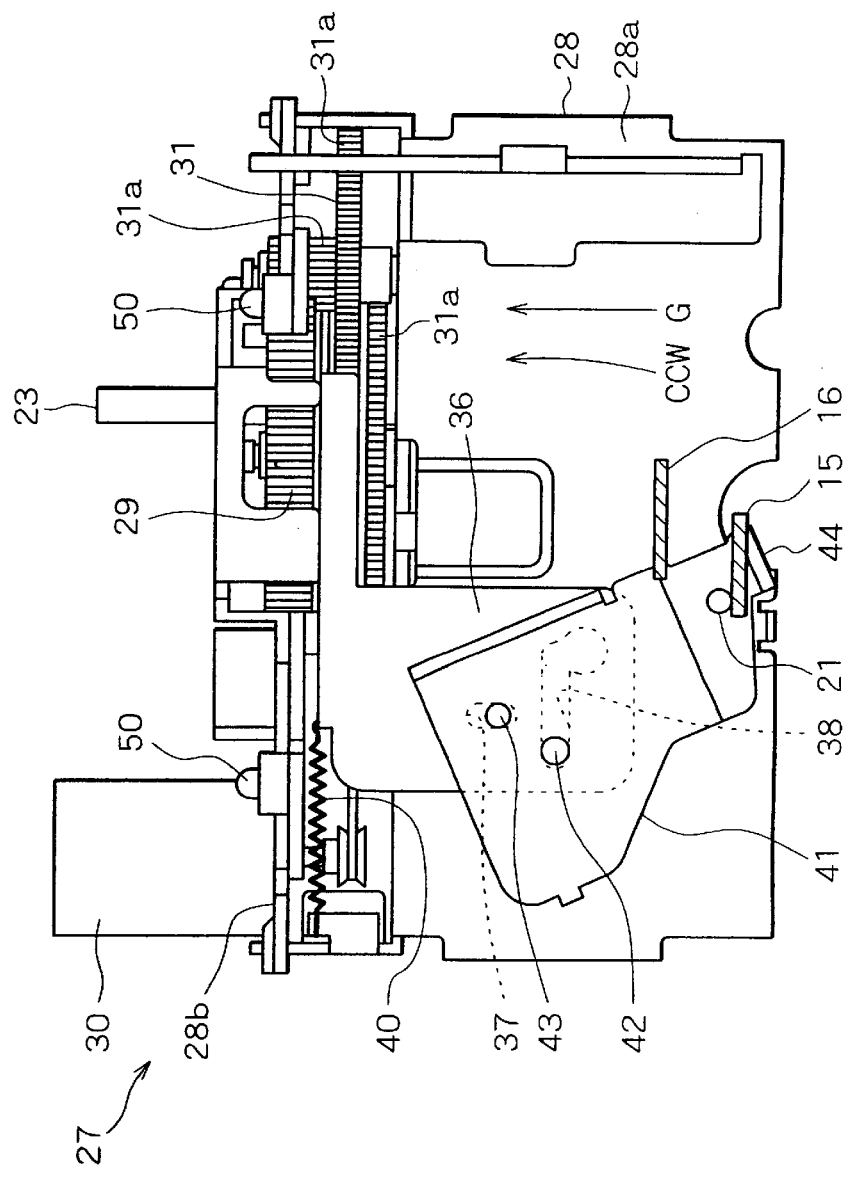
FIG. 25 is a plan view, similar to FIG. 24, showing a state that the lid body is located at the lid open state, which state corresponds to that shown in FIG. 23.
Figure 26:
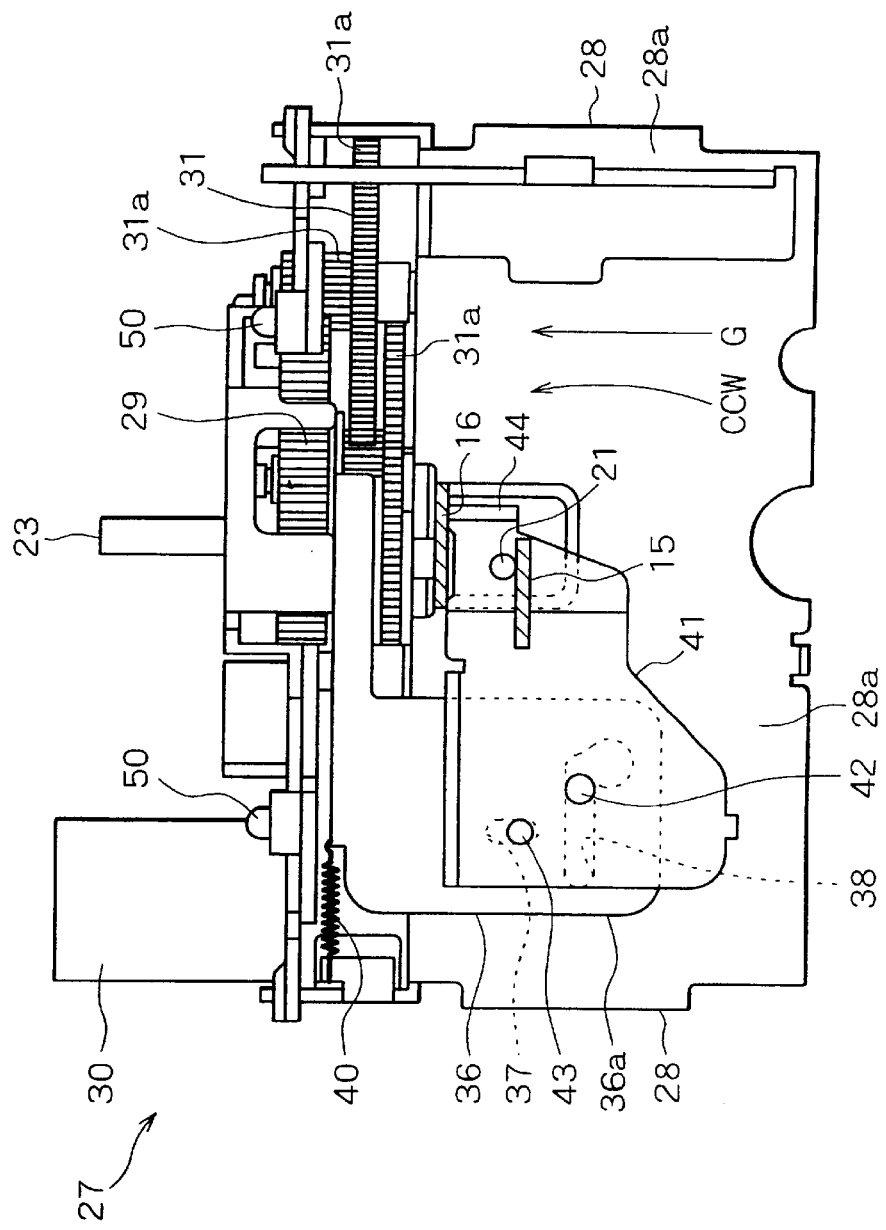
FIG. 26 is a plan view, similar to FIG. 24, showing a state immediately before the lid body reaches the lid close state.

As is apparent from FIGS. 24 to 26, a turning arm 41 is provided on the upper surface portion 28a of the drive portion chassis 28 in such a manner that a portion, near the left end, of the turning arm 41 is turnably supported by a supporting shaft 42. The turning arm 41 is positioned so as to be overlapped, from above, to the upper surface portion 36a of the slider 36 in such a manner that the supporting shaft 42 passes through the escape hole 38 of the slider 36. Accordingly, the presence of the supporting shaft 42 does not obstruct the movement of the slider 36 in the lateral direction. A connection pin 43 is provided on a portion, near the turning fulcrum portion, of the turning arm 41 in such a manner as to project downwardly therefrom, and is slidably engaged in the connection hole 37 of the slider 36. Along with the movement of the slider 36 in the lateral direction, the connection pin 43 is pushed leftwardly or rightwardly by the connection hole 37, whereby the turning arm 41 is turned around the supporting shaft 42. The above-described pressing projection 21 is erected on an end portion, opposed to the turning fulcrum portion, of the turning arm 41. A stopper piece 44 is provided on the turning arm 41 in such a manner as to project upwardly therefrom. In the lid close state, the stopper piece 44 is kept in the longitudinal direction.

The operation of the second moving means will be described in detail below.

Figure 19:
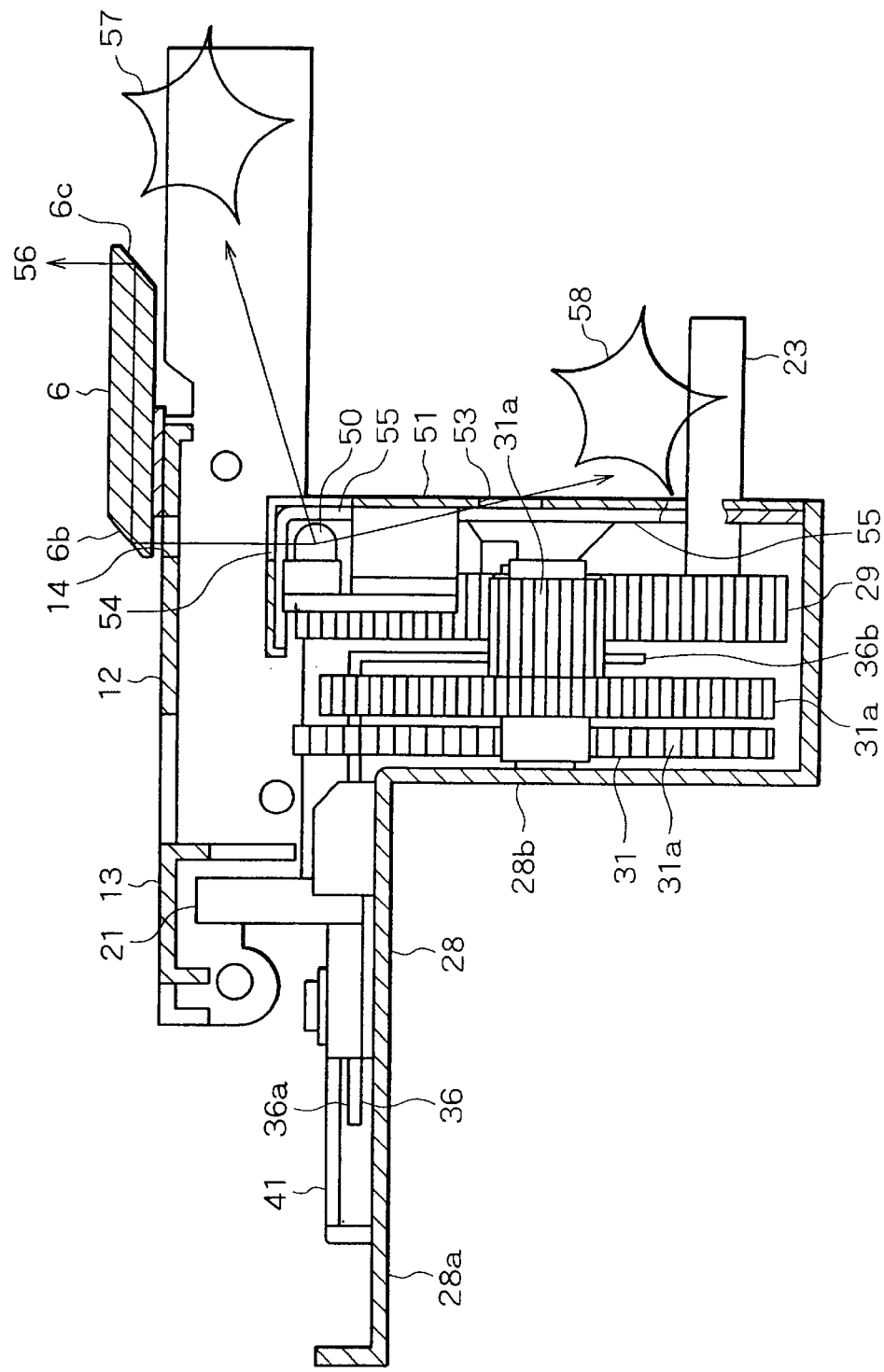
FIG. 19 is a sectional view taken on line XIX—XIX of FIG. 17.

FIGS. 19, 21, and 24 shows the second moving means in the reproducing state. In this reproducing state, the lid body unit 13 is kept in the lid close state, wherein the cam follower 39 of the slider 36 is brought, from right, into contact with the initial portion 35a of the cam edge 35 of the cam gear 29. Accordingly, the slider 36 is positioned at the left end in the movement range, and the turning arm 41 is kept in such a posture that the connection pin 34 of the turning pin 41 is nearly lined up with the pressing projection 21 in the lateral direction and the stopper piece 44 of the turning arm 41 is located under the stopper piece 16 of the lid body unit 13. The lid body unit 13 is, as described above, biased in the direction toward the lid close direction only by the tensile coil springs 20, and therefore, the lid body unit 13 can be moved in the direction to the lid open position by applying forces more than the biasing forces of the tensile coil springs 20 to the direction toward the lid open position. However, in the lid close state, as described above, the stopper piece 44 of the turning arm 41 is positioned under the stopper piece 16 of the lid body unit 13 (see FIG. 19), so that the lid body unit 13 cannot be forcibly moved to the direction toward the lid open position. More concretely, the lid body unit 13 is configured to be moved obliquely forwardly, downwardly once and then moved forwardly in the horizontal direction, and therefore, since the lid body unit 13 is prevented from being moved downwardly by the presence of the stopper piece 44 positioned under the stopper piece 16 of the lid body unit 13, the lid body unit 13 cannot be moved forwardly, that is, in the direction toward the lid open position. In other words, the lid body unit 13 is locked at the lid close position.

When an ejection instruction is given for bringing the mechanical deck 2 from the reproducing state shown in FIGS. 21 and 24 to the ejection state, the cam gear 29 is turned counterclockwise, that is, in a direction shown by an arrow CCW in FIG. 21. Even if the cam gear 29 is turned counterclockwise, the slider 36 is not moved insofar as the cam follower 39 is moved within the non-variable region of the initial portion 35a of the cam edge 35. The cam follower 39 then enters the intermediate portion 35c of the cam edge 35. At this time, along with the counterclockwise turning of the cam gear 29, the cam follower 39 is moved to a portion close to the center of the cam gear 29 in the variable region of the intermediate portion 35c of the cam edge 35. As a result, the cam follower 39 is pulled rightwardly, that is, in a direction shown by an arrow J in FIG. 22, and thereby the slider 36 is moved rightwardly against the biasing force of the tensile coil spring 40.

As the slider 36 is moved rightwardly, the connection hole 37 of the slider 36 pushes the connection pin 43 of the turning arm 41 rightwardly, so that the turning arm 41 is turned clockwise, that is, in a direction shown by an arrow CW in FIG. 24. Along with the clockwise turning of the turning arm 41, the pressing projection 21 erected at the turning end portion of the turning arm 41 is moved nearly forwardly, that is, in a direction shown by an arrow F in FIG. 24, to press the piece 15 to be pressed of the lid body unit 13 in the forward direction. Accordingly, as described above with reference to FIGS. 7 to 9, the lid body unit 13 is sunk obliquely forwardly, downwardly once and is then moved forwardly in such a manner that the pins 17 to be guided are guided in the guide holes 10 and 11 formed in the chassis main body 8. It is to be noted that in the initial state that the turning arm 41 is started to be turned clockwise as shown in FIG. 24, the pressing projection 21 is left as separated slightly rearwardly from the piece 15 to be pressed yet, and in a period until the pressing projection 21 is started to forwardly press the piece 15 to be pressed, the stopper piece 44 of the turning arm 41 is released forwardly from the lower side of the stopper piece 16 of the lid body unit 13, with a result that the locking state of the lid body unit 13 to the lid close position is released.

Until the cam follower 39 reaches an end (see FIG. 22), on the terminal portion 35b side, of the variable region of the intermediate portion 35c of the cam edge 35 of the cam gear 29, the slider 36 is continued to be moved rightwardly, and correspondingly the turning arm 41 is continued to be turned clockwise in FIG. 24. When the slider 36 reaches the non-variable region of the terminal portion 35b shown in FIG. 22, the rightward movement of the slider 36 and the clockwise turning of the turning arm 41 are stopped. The lid body 6 thus reaches the lid open position shown in FIGS. 6 and 9.

The cam gear 29 is further turned counterclockwise from the state shown in FIG. 22; however, since the cam follower 39 of the slider 36 is moved within the non-variable region of the terminal portion 35b of the cam edge 35, the slider 36 is no longer moved rightwardly, and correspondingly the turning arm 41 is no longer turned clockwise. By the rotation of the cam gear 29 in the period until the cam follower 39 is moved within the non-variable region (from an end on the intermediate portion 35c side to an end opposed to the intermediate portion 35c) of the terminal portion 35b of the cam edge 35, the mechanical deck 2 is turned to the ejection position shown in FIGS. 2 and 6, so that the disc reproducing apparatus 1 is brought into the ejection state, for example, shown in FIG. 2.

In the above-described ejection state, the insertion or ejection of the disc cartridge 7 (see FIG. 2), that is, the operation of ejecting the disc cartridge 7 left as inserted in the mechanical deck 2 therefrom or inserting a new disc cartridge 7 in the mechanical deck 2 is performed.

When a reproducing instruction is given after the insertion/ejection of the disc cartridge 7 in the ejection state as shown in FIG. 2, for example, is completed, the motor 30 is rotated in the direction reversed to the above-described rotational direction for bringing the mechanical deck into the ejection state, so that the cam gear 29 is turned clockwise, that is, in a direction shown by an arrow CW in FIG. 23. As a result, the portion, positioned on the left side of the cam follower 39 of the slider 36, of the cam edge 35 is changed from the terminal portion 35b to the intermediate portion 35c and is further changed, in the variable region of the intermediate portion 35c, from the end on the terminal portion 35b side to the end on the initial portion 35a side, and thereby the slider 36 is moved leftwardly, that is, in the direction I shown in FIGS. 21 to 23 by the biasing force of the tensile coil spring 40. Along with the leftward movement of the slider 36, the connection hole 37 of the slider 36 leftwardly pushes the connection pin 43 of the turning arm 41, so that the turning arm 41 is turned counterclockwise, that is, in a direction shown by an arrow CCW in FIG. 25. When the turning arm 41 is turned counterclockwise in FIG. 25, the pressing projection 21 erected on the turning end portion of the turning arm 41 is moved nearly rearwardly, that is, in a direction shown by an arrow G in FIG. 25, to thereby go away rearwardly from the piece 15 to be pressed of the lid body unit 13. As result, the lid body unit 13 is moved rearwardly, that is, toward the lid close position by the biasing forces of the tensile coil springs 20.

When the lid body unit 13 reaches the lid close position, the pins 17 to be guided of the lid body unit 13 come into contact with the rear ends of the guide holes 10 and 11 of the chassis main body 8, to thereby stop the rearward movement of the lid body unit 13. At this time, the turning arm 41 is in the state shown in FIG. 26, in which the stopper piece 44 of the turning arm 41 is positioned slightly forwardly of the stopper piece 16 of the lid body unit 13. The turning arm 41 is further turned counterclockwise from the position shown in FIG. 26, and when the turning arm 41 reaches the position shown in FIG. 24, the motor 30 is stopped and thereby the leftward movement of the slider 36 and the counterclockwise turning of the turning arm 41 are stopped.

As described above, the movement of the lid body unit 13 to the lid open position is performed by the pressing motion applied thereto from the pressing projection 21 via the piece 15 to be pressed; however, the movement of the lid body unit 13 to the lid close portion is performed not by any pressing motion applied thereto but by the biasing forces of the tensile coil springs 20. Accordingly, if a foreign matter is present in the gap 5 between the front end surface 2b of the mechanical deck 2 and the front half portion 3a' of the upper surface portion 3a of the housing 3 during movement of the lid body unit 13 to the lid close position, only the biasing forces of the tensile coil springs 20 are applied to the foreign matter or the lid body unit 13, particularly, the lid body 6, with a result that the foreign matter, the lid body 6, or any component of the drive mechanism portion 27 is not damaged.

In the case of shifting the ejection state shown in FIG. 2 to the reproducing state shown in FIG. 1, there is no problem if the disc cartridge 7 has been perfectly inserted in the mechanical deck 2 or the disc cartridge 7 is not present in the mechanical deck 2; however, there is a problem if the disc cartridge 7 is present in the mechanical deck 2 in a half-and-half state. To be more specific, as shown in FIG. 28, when the mechanical deck 2 is moved from the ejection position to the reproducing position in a state that the disc cartridge 7 is positioned in the disc insertion port 4, the portion, projecting from the front surface 2b of the mechanical deck 2, of the disc cartridge 7 may collide with the housing 3 or the lid body 6, tending to damage the disc cartridge 7, the inner mechanism of the mechanical deck 2, the housing 3, or the lid body 6.

To cope with such a problem, the disc reproducing apparatus 1 is provided with a disc detecting means 45 for prohibiting the movement of the mechanical deck 2 to the reproducing position when the disc cartridge 7 is positioned across the disk insertion port 4.

Figure 27:
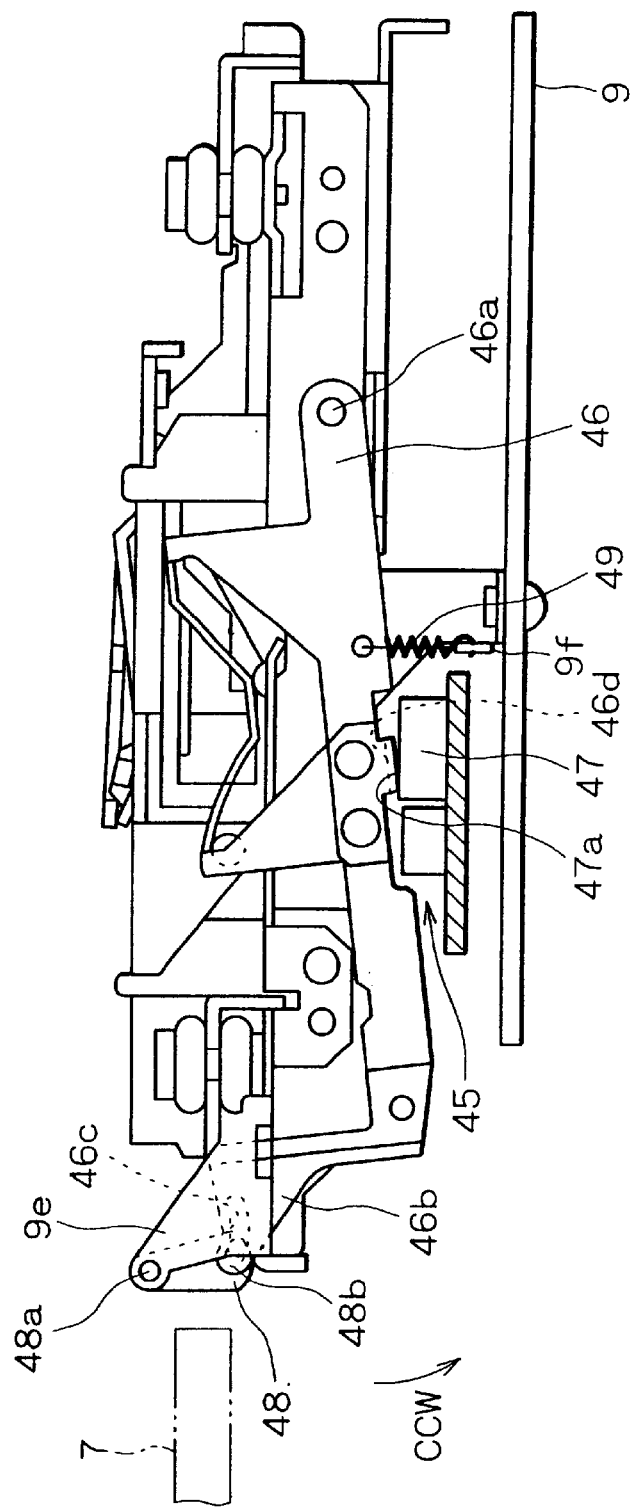
FIG. 27 is a sectional view of an essential portion of a disc detecting means, showing a state immediately before the disc cartridge is inserted in the mechanical deck.
Figure 28:
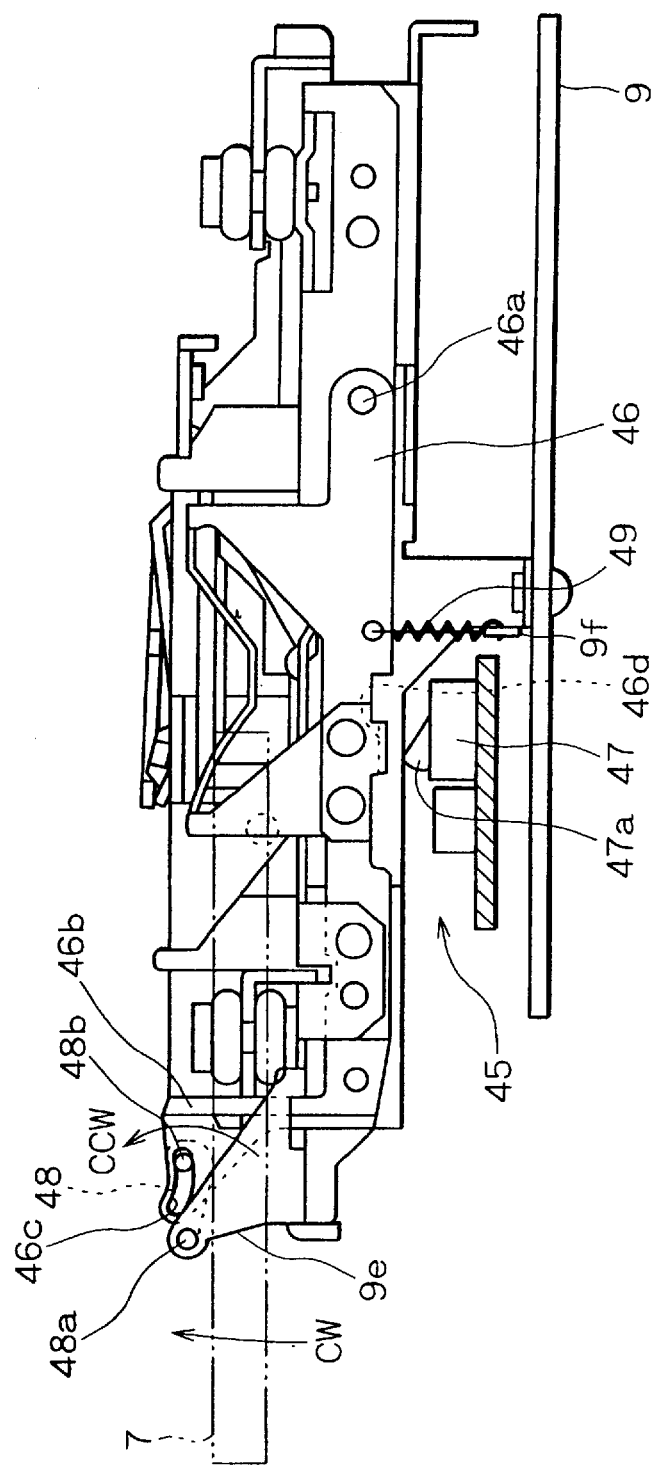
FIG. 28 is a sectional view, similar to FIG. 27, showing a state that the disc cartridge is positioned at a disc insertion port.
Figure 29:
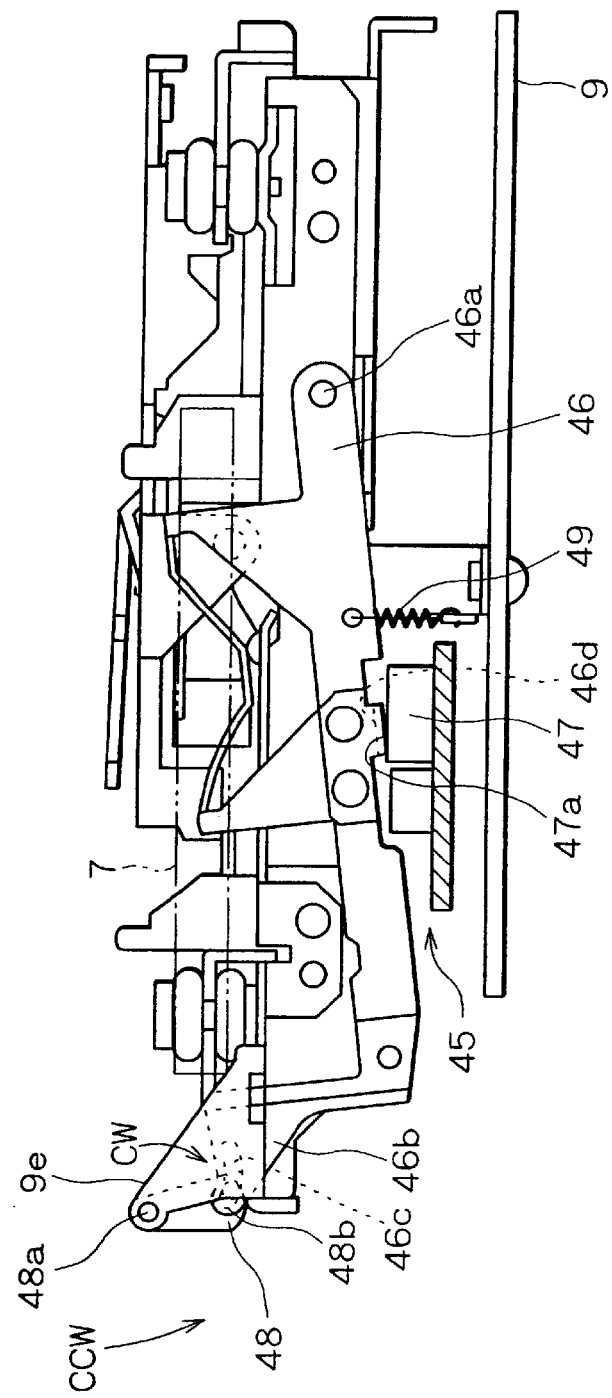
FIG. 29 is a sectional view, similar to FIG. 27, showing a state that the disc cartridge is perfectly inserted in the mechanical deck.

As shown in FIGS. 27 to 29, the disc detecting means 45 includes a detecting arm 46 and a detecting switch 47 actuated by the detecting arm 46.

A door body 48 is provided for the disc insertion port 4. The door body 48 is formed into a plate-like shape elongated in the lateral direction. Both end portions 48a (only one is shown in FIGS. 27 to 29) of an upper end portion of the door body 48 are turnably supported by two supporting pieces 9e (only one is shown in FIGS. 27 to 29) provided on left and right end sides of the front end portion of the mechanical chassis 9. A connection pin 48b projecting rightwardly is formed at the lower end of the right end portion of the door body 48.

The detecting arm 46 extends longer in the longitudinal direction, and a rear end portion 46a (turning fulcrum portion) thereof is turnably supported by the mechanical chassis 9. An upwardly projecting connection portion 46b is provided on a front end portion of the detecting arm 46. A connection hole 46c having a circular-arc shape being longer in the longitudinal direction and recessed downwardly is formed in an upper end portion of the connection portion 46b. The connection pin 48b of the door body 48 is slidably engaged in the connection hole 46c. Accordingly, the detecting arm 46 is turnable in the vertical direction along with the opening/closing motion of the door body 48. A switch pressing piece 46d is projectingly provided on the detecting arm 46 at an approximately intermediate position in the longitudinal direction.

A tensile coil spring 49 is stretched between a portion, in front of the turning fulcrum portion 46a, of the detecting arm 46 and a spring catch portion 9f formed on a lower end portion of the mechanical chassis 9, to bias the detecting arm 46 counterclockwise, that is, in a direction shown by an arrow CCW in FIG. 27.

The detecting switch 47 is supported by the mechanical chassis 9 in such a manner that an operating piece 47a thereof is located at a position corresponding to that of the switch pressing piece 46d of the detecting arm 46 (see FIGS. 27 to 29).

In a state that the disc cartridge 7 is not inserted in the mechanical deck 2, as shown in FIG. 27, the detecting arm 46 is left as turned counterclockwise by the biasing force of the tensile coil spring 49 so that the operating piece 47a of the detecting switch 47 is left as pressed by the switch pressing piece 46d of the detecting arm 46. The biasing force of the tensile coil spring 49 is also exerted on the door body 48 via the connection hole 46c of the detecting arm 46, so that the door body 48 is left as closing the disc insertion port 4 as shown in FIG. 27. When a reproducing instruction is given in such a state, the motor 30 is rotated for turning the mechanical deck 2 to the reproducing position.

As the disc cartridge 7 is started to be inserted in the mechanical deck 2, the door body 48 is pushed by the disc cartridge 7, to be turned counterclockwise, that is, in a direction shown by an arrow CCW in FIG. 28, thereby opening the disc insertion port 4. When the door body 48 is turned counterclockwise, the turning force is applied to the connection hole 46c of the detecting arm 46 via the connection pin 48b of the door body 48, with a result that the detecting arm 46 is turned clockwise, that is, in a direction shown by an arrow CW in FIG. 28 against the biasing force of the tensile coil spring 49. The clockwise turning of the detecting arm 46 causes the upward movement of the intermediate portion, on which the switch pressing piece 46d is provided, of the detecting arm 46. As a result, the operating piece 47a of the detecting switch 47 becomes a state being not pressed by the switch pressing piece 46d. If a reproducing instruction is given in such a state that the operating piece 47a of the detecting switch 47 is not pressed by the switch pressing piece 46d, the motor 30 is not driven, and consequently, the mechanical deck 2 is not turned to the reproducing position.

When the disc cartridge 7 is perfectly inserted in the mechanical deck 2 as shown in FIG. 29, since any member (the disc cartridge 7, in this case) for turning the door body 48 counterclockwise as shown in FIG. 28 is not present, the detecting arm 46 is turned counterclockwise, that is, in a direction shown by an arrow CCW in FIG. 29 by the biasing force of the tensile coil spring 49, and consequently, the door body 48 is turned clockwise, that is, in a direction shown by an arrow CW in FIG. 29. As a result, the door body 48 closes the disc insertion port 4, and the switch pressing piece 46d of the detecting arm 46 presses the operating piece 47a of the detecting switch 47. In the state that the operating piece 47a of the detecting switch 47 is pressed by the switch pressing piece 46d, when the reproducing instruction is given as described above, the motor 30 is rotated, and consequently, the mechanical deck 2 is turned to the reproducing position.

As shown in FIGS. 19 and 20, left and right light sources 50 are disposed on an upper end portion of the rear surface of the rear surface portion 28b of the drive portion chassis 28 at intermediate positions between the left and right ends and the central portion of the upper end portion. The light source 50 is exemplified by a small-sized incandescent lamp in this embodiment but may be configured as any other light source such as a light emitting diode.

Figure 17:
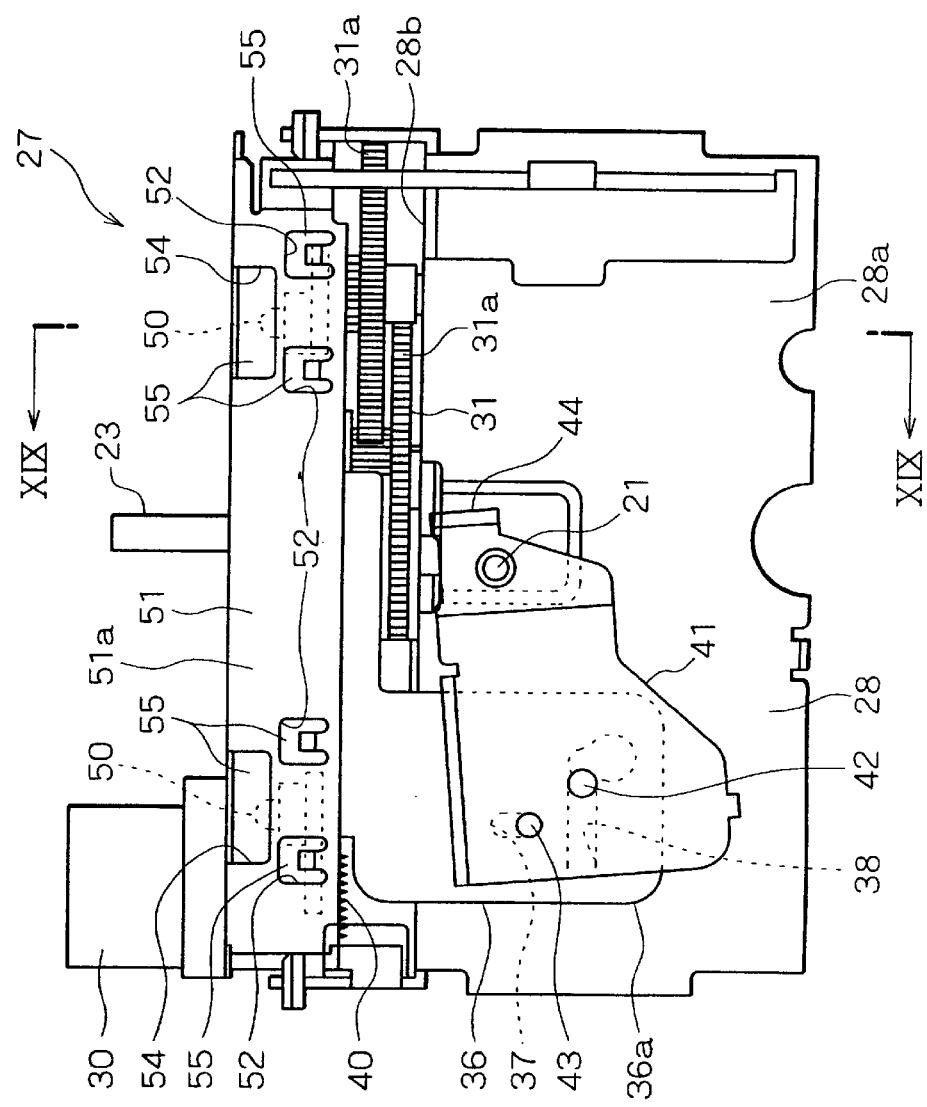
FIG. 17 is a plan view of a drive mechanism portion.
Figure 18:
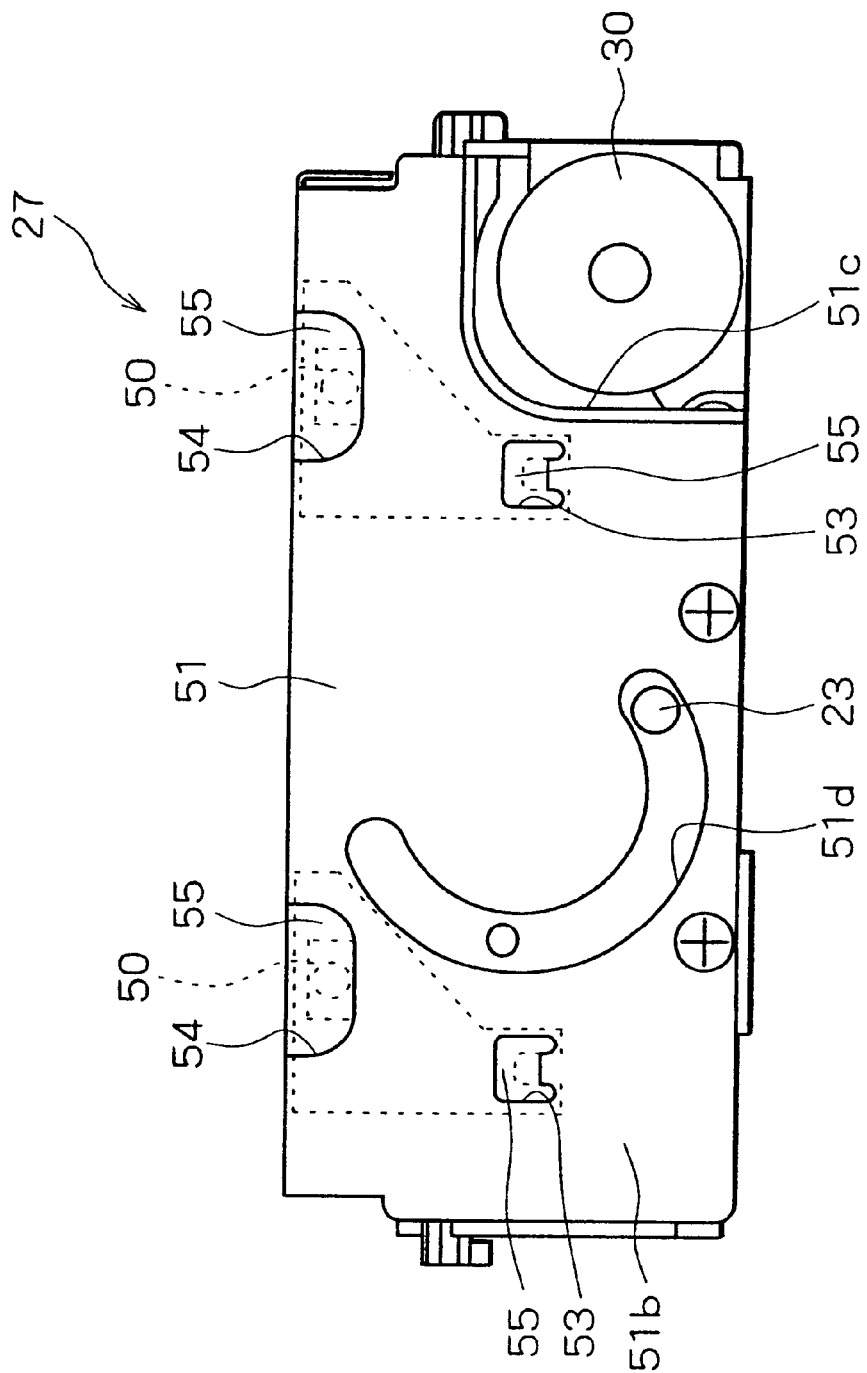
FIG. 18 is a rear view of the drive mechanism portion shown in FIG. 17.

All of the upper surface of the rear end portion of the drive portion chassis 28 and most of the rear surface of the drive portion chassis 28 are covered with a rear cover 51 (see FIGS. 17 to 19). The rear cover 51 includes an upper surface portion 51a for covering all of the upper surface of the rear end portion of the drive portion chassis 28, and a rear surface portion 51b for covering most of the rear surface of the drive portion chassis 28. The rear surface portion 51b is integrally suspended from the rear edge of the upper surface portion 51a. The rear surface portion 51b has at its right end portion a cutout 51c allowing the motor 30 to project rearwardly therethrough, and also has at its central portion a circular-arc slit 51d allowing the drive pin 23 to project rearwardly therethrough (see FIG. 18).

Two pairs of translucent windows 52 are formed in the upper surface portion 51a of the rear cover 51 at portions near the left and right ends, respectively (see FIG. 17). Two translucent windows 53 are formed in the rear surface portion 51b at positions near the left and right ends of an intermediate portion in the vertical direction, respectively (see FIG. 18). Two translucent windows 54 are formed in a boundary portion between the upper surface portion 51a and the rear surface portion 51b at positions near the left and right ends, respectively (see FIGS. 17 and 18). Each of the translucent windows 52, 53, and 54 is covered with a light diffusion/transmission plate 55 allowing diffusion of light and transmission of the diffused light, for example, a milky semi-transparent plate.

In a state that the disc reproducing apparatus 1 is left as turned on, the light sources 50 are usually kept as lighting up. Accordingly, light from the light sources 50 passes through the translucent windows 52, 53, and 54 and the light diffusion/transmission plates 55, to be diffused upwardly and rearwardly. When the lid body unit 13 is located at the lid close position, since the slit 14 formed in the supporting frame 12 is positioned directly over the translucent windows 52 formed in the upper surface portion 51a of the rear cover 51 (see FIG. 19), light having a relatively large intensity, which has passed through the translucent windows 52, is made incident on the lid body 6 through the slit 14. Most of the light, which has entered the lid body 6, is full-reflected from the front side tilt plane 6b to be directly propagated rearwardly in the lid body 6 or indirectly propagated rearwardly in the lid body 6 while being repeatedly reflected from the inner plane of the lid body 6. Most of the light component 56, which has reached the rear portion of the lid body 6, is nearly full-reflected from the rear side tilt plane 6c of the lid body 6 to be almost directed upwardly, and is emerged upwardly from the upper surface 6a of the lid body 6 (see FIG. 19). Accordingly, when the lid body 6 located at the lid close position is viewed from above, the rear end portion of the lid body 6 appears as an intensively luminous thin strip. In addition, all of the light, which has been made incident on the lid body 6, is not full-reflected from the rear side tilt plane 6c to be emerged upwardly therefrom, but part of the light is emerged upwardly from the upper surface 6a of the lid body 6 because the propagation angle of the light with respect to the upper surface 6a becomes smaller than a critical angle due to repeated reflection from the inner surface of the lid body 6. With such light, the whole of the lid body 6 shines dimly, which desirably exaggerates the existence of the lid body 6, contributing to creation of a high-grade feeling of the whole reproducing apparatus.

If the lid body 6 is within the lid close region but it does not perfectly reach the lid close position because of some cause, for example, insertion of a foreign matter between the lid body unit 13 and the mechanical deck 2, since the slit 14 is offset from the position directly over the translucent windows 52, the light little enters the lower surface of the front end portion of the lid body 6, with a result that the rear end portion of the lid body 6 does not appear as an intensively luminous thin strip. As a result of comparison between such a state and the above-described state that the lid body 6 is located at the lid close position and thereby the rear end portion of the lid body 6 appears as an intensively luminous thin strip, it can be decided whether or not the lid body 6 is perfectly located at the lid close position. The light components 57 and 58 (shown as undefined polygonal images in FIG. 19) of the light sources 50, which have passed through the other translucent windows 53 and 54, pass through the lid body 6, to dimly illuminate a rearward, obliquely upward portion (by the light component 57) and a portion between the drive mechanism portion 27 and the front surface 2b of the mechanical deck 2 (by the light component 58), contributing to the creation of a high-grade-feeling of the whole reproducing apparatus.

According to the above-described disc reproducing apparatus 1, the front end portion, which has the disc insertion port 4, of the mechanical deck 2 projects upwardly only in the ejection state for insertion or ejection of the disc cartridge 7, and in the other reproducing state, that is, when the disc is being reproduced or the apparatus 1 is during stoppage or not in service, the front surface 2b, in which the disc insertion port 4 is formed, of the mechanical deck 2 is covered with the lid body 6, and the upper surfaces 2a, 3a and 6a of the mechanical deck 2, the housing 3, and the lid body 6 are positioned within the same plane. As a result, the interior of the apparatus 1 is prevented from being touched by a user or any foreign matter is prevented from being permeated in the recording medium insertion port, and further the external appearance becomes neat, contributing to the creation of a high-grade feeling of the appearance.

Since the motion timings of the two moving means for moving the mechanical deck 2 and the lid body 6 in order to realize the above-described ejection state and the reproducing state are controlled by the drive pin 22 and the cam edge 35 provided on one cam gear, the synchronization control of the two moving means can be accurately performed, to thereby prevent the high-grade feeling from being harmed due to the offset of the action therebetween or the like.

The moving means for moving the mechanical deck 2 and the moving means for moving the lid body 6 are driven by one motor 30, it is possible to simplify the drive mechanism, and to easily perform the timing control between the two moving means.

In the above-described embodiment, the present invention has been described by example of the disc reproducing apparatus; however, the present invention is not limited thereto but may be applied to a recording and/or reproducing apparatus without departing from the technical scope of the present invention.

In the embodiment, the recording medium is exemplified by a disc; however, it may be configured as a tape-like recording medium, and therefore, the present invention may be applied to a recording and/or reproducing apparatus using such a tape-like recording medium without departing from the technical scope of the present invention.

The specific shapes and structures of the components in the above-described embodiment are for illustrative purposes only for embodying the present invention, and therefore, the technical scope of the present invention should not be construed to be limited thereto.

What is claimed is:

1. A recording medium reproducing apparatus comprising:
    a recording medium mounting portion has one end thereof turnably supported by a chassis main body and an other end thereof has a recording medium insertion port;
    a housing in which said recording mounting portion is housed;
    a lid body movable between a lid close position at which said lid body is positioned such that an outer surface thereof is continuous to an outer surface of said housing for covering said recording medium insertion port, and a lid open position at which said lid body is positioned inside said housing for opening said recording medium insertion port;
    first moving means for turning said recording medium mounting portion between a reproducing position at which said recording medium insertion port is covered with said lid body and an ejection position at which said recording medium insertion port is directed outwardly;
    second moving means for moving said lid body from said lid close position to said lid open position; and
    synchronization means for controlling said first and second moving means in synchronization with each other in that said lid body is moved inside said housing by said second moving means and simultaneously said recording medium mounting portion is turned to said ejection position by said first moving means to allow said recording medium insertion port to be directed outwardly.

2. The recording medium reproducing apparatus according to claim 1, further comprising:
    a guide hole formed in said chassis main body for guiding movement of said lid body between said lid close position and said lid open position; and
    biasing means for biasing said lid body to said lid close portion,
    wherein the movement of said lid body to said lid close position is performed by said biasing means.

3. The recording medium reproducing apparatus according to claim 2, further comprising:
    means for defining a moving path of said lid body along which said lid body is moved in an inward direction of said housing from said lid close position, being separated from said recording medium insertion port, and along which said lid body is moved to a back surface side of said housing; and
    a turning arm provided on said second moving means is as to be turnable between a first position and a second position, said turning arm having a pressing portion for pressing said lid body to said lid open position when said turning arm is turned to said second position,
    wherein said turning arm is provided with a lock portion for prohibiting the movement of said lid body, located at said lid close position in the inward direction of said housing when said turning arm is located at said first position.

4. The recording medium reproducing apparatus according to claim 1, further comprising:
    a drive member for driving said first moving means and second moving means, said drive member being driven by a motor.

5. The recording medium reproducing apparatus according to claim 1, wherein said recording medium mounting portion, located at said reproducing position, is tilted from said housing such that an end portion in which said recording medium insertion port is formed is offset toward said ejection position side relative to an end portion on a turning fulcrum side.

6. The recording medium reproducing apparatus according to claim 1, further comprising:
    imperfect state detecting means for detecting an imperfect state, wherein a recording medium is positioned within said recording medium mounting portion but is not correctly inserted therein,
    wherein the movement of said recording medium mounting portion to said reproducing position is prohibited when the imperfect state of said recording medium is detected by said imperfect state detecting means.

7. The recording medium reproducing apparatus according to claim 6, wherein said imperfect state detecting means detects the imperfect state based on a state of a disc detecting switch in said recording medium mounting portion.

8. The recording medium recording apparatus according to claim 1, further comprising:
    a light source provided in said housing at a position non-viewable in perspective from an exterior of said housing,
    wherein light emitted from said light source is made incident on one end plane of said lid body and is emerged from an other end plane of said lid body as reflection light.

9. The recording medium reproducing apparatus according to claim 8, wherein said light source is disposed such that the light emitted from said light source is most incident on said lid body when said lid body is located at one of said lid open position and said lid close position.

10. The recording medium reproducing apparatus according to claim 8, further comprising:
    diffusion/emission means for diffusing the light emitted from said light source and emitting the diffused light in a predetermined direction,
    wherein said lid body has a transparent portion through which an area irradiated with the diffused light along said specific direction is viewable when said lid body is located at said lid close position.

11. A recording medium reproducing apparatus comprising:
    a recording medium mounting portion provided such that one end thereof is turnably supported by a chassis main body and an other end thereof has a recording medium insertion port;
    a lid body provided for covering said recording medium insertion port, said lid body being disposed on a plane continuous to an outer surface of a housing;
    a first moving member, part of which is engaged with said recording medium mounting portion, said first moving member being moved by a motor for turning said recording medium mounting portion to a position at which said recording medium insertion port is directed outwardly of said housing;

a second moving member for holding said lid body and allowing said lid body to be moved inside said chassis main body and further moved on a back surface side of said housing while being guided in a guide hole by means of which part of said lid body is supported; and a synchronization member for controlling said first and second moving members in synchronization with each other in such a manner that said lid body is moved inside said chassis main body and on the back surface side of said housing by said second moving member and simultaneously said recording medium mounting portion is turned in an open direction by said first moving member to allow said recording medium insertion port to be directed outwardly.

* * * * *